United States Patent [19]

Vala et al.

[11] Patent Number: 5,003,189

[45] Date of Patent: Mar. 26, 1991

[54] DOCUMENT-IMAGING ILLUMINATION WITH FIBRE-OPTIC INTENSITY-ADJUST

[75] Inventors: John Vala, Plymouth; Gerald Banks, Ann Arbor, both of Mich.

[73] Assignee: Unisys Corp., Detroit, Mich.

[21] Appl. No.: 419,572

[22] Filed: Oct. 10, 1989

[51] Int. Cl.$^5$ ............... G06K 7/10; G01N 9/04
[52] U.S. Cl. ............... 250/566; 250/223 R; 250/227.24
[58] Field of Search ............... 250/227.32, 227.2, 578.1, 250/572, 216, 208.1, 566, 568–571, 223 R, 227.28, 227.24, 555–556; 356/71; 350/96.25, 96.29, 96.28, 96.27; 358/484; 235/473; 382/7, 67

[56] References Cited

U.S. PATENT DOCUMENTS

| | | | |
|---|---|---|---|
| 3,928,759 | 12/1975 | Sansone | 250/216 |
| 4,264,202 | 4/1981 | Gugliotta et al. | 250/572 |
| 4,326,258 | 4/1982 | de la Guardia | 382/7 |
| 4,460,826 | 7/1984 | Pryor | 250/227.2 |
| 4,592,090 | 5/1986 | Curl et al. | 250/556 |
| 4,749,250 | 6/1988 | Carter | 350/96.18 |
| 4,758,715 | 7/1988 | Stamm | 250/566 |
| 4,821,332 | 4/1989 | Durham | 356/71 |

Primary Examiner—David C. Nelms
Assistant Examiner—Michael Messinger
Attorney, Agent, or Firm—John J. McCormack; Mark T. Starr

[57] ABSTRACT

A check Sorter-Imager-Processor with two (or more) imaging sites, each lit by a beam through a fibre-optic array—with a lens focusing the beam on each array such that a shift in lens-focus reduces output light from the array,—the two sites being thus "matched" in light-intensity by merely focus-adjusting these lenses.

12 Claims, 34 Drawing Sheets

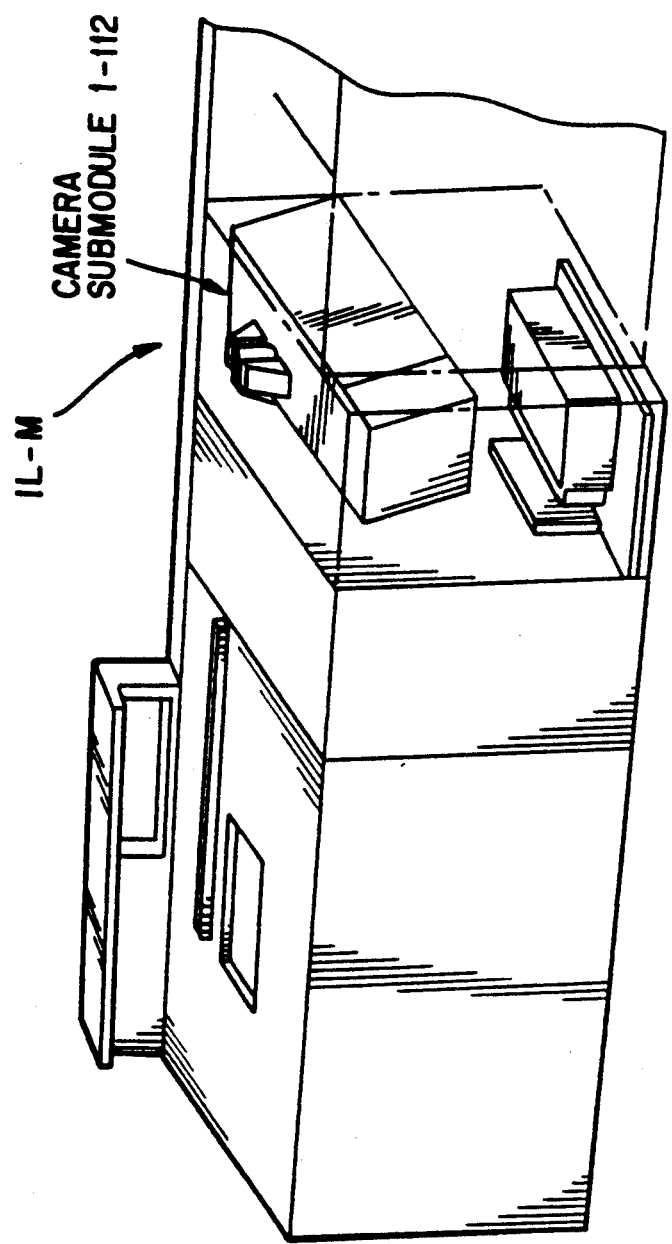

BUNDLE SPECIFICATIONS

UNIFORMITY:

±10% as measured 1.25" from the line end of the bundle 21, 21' (in the plane of the document) with input illumination of 30° full angle to the bundle.

$$\text{+/- Percent Uniformity} = \frac{V_{MAX} - V_{MIN}}{V_{MAX} + V_{MIN}}$$

RANDOMIZATION:

Satisfactory randomization exists when a zone 1/2" long is in contrast with the background illumination at the line end of the fiber bundle and at least 36 evenly distributed discrete areas of similar contrast appear at the round, common input end of the fiber bundle 21, 21'.

FIBER MATERIAL:

Glass, Step Index fiber with a Numerical Aperture of 0.55

TEMPERATURE:

The round common input end of the fiber bundle should withstand a continuous operating temperature of 200°C.

*FIG. 14A*

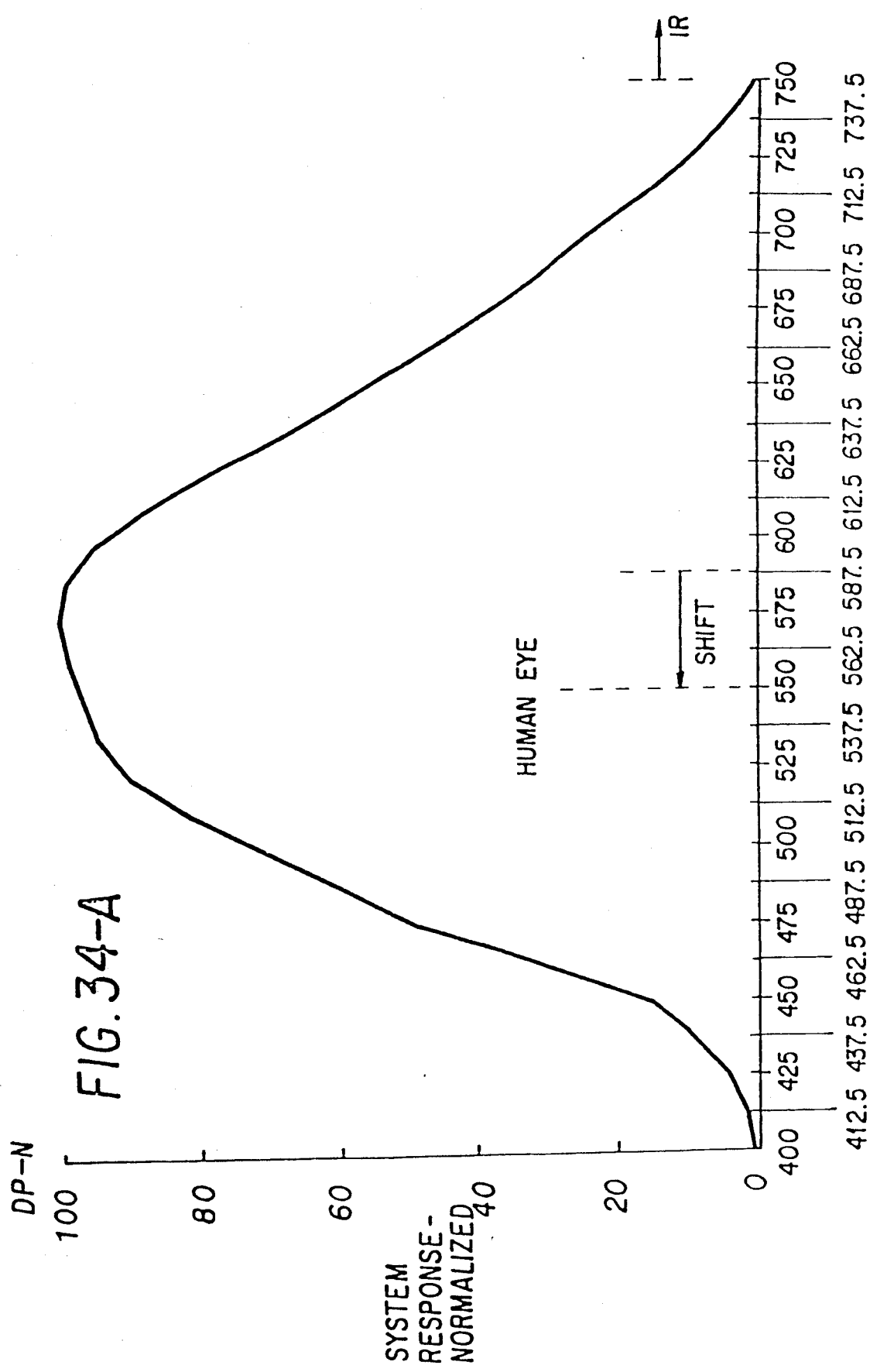

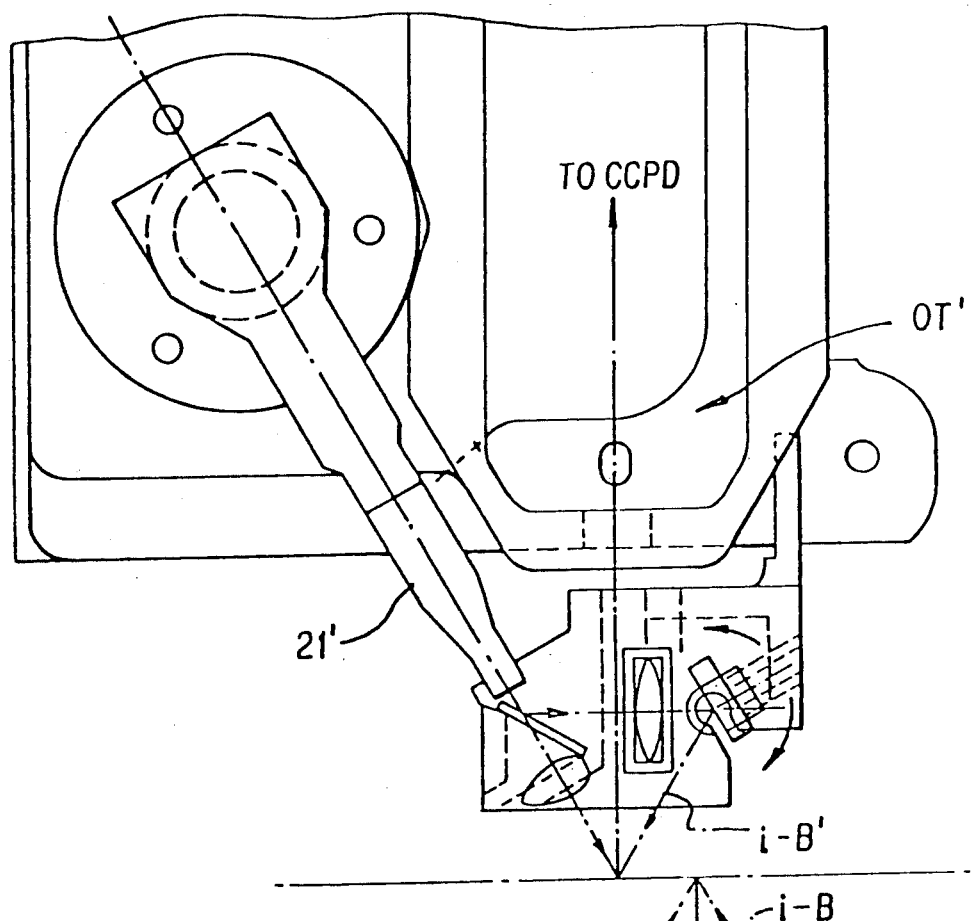
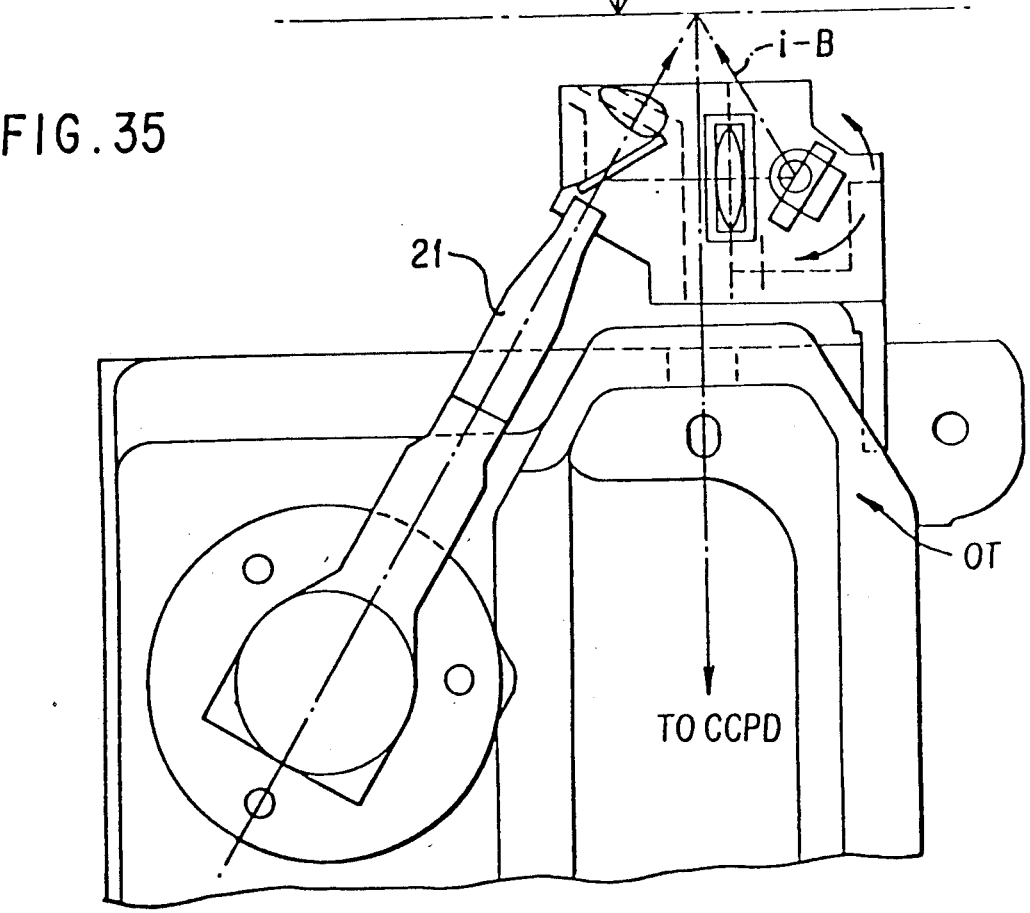
FIG. 35

DOCUMENT-IMAGING ILLUMINATION WITH FIBRE-OPTIC INTENSITY-ADJUST

FIELD OF THE INVENTION

This invention relates to illumination for automatic, high-speed document processing, and more particularly to associated lens/fibre-optic means for adjusting light intensity.

BACKGROUND, FEATURES

High-speed check processing systems are well known in the art. These require intense illumination means as workers know, especially with "electronic-imaging", where images of the two sides of a check are taken, stored and retrieved—as opposed to physically handling checks to process them. Many difficulties and disadvantages of present systems relate to how well the checks are imaged and illuminated. If the documents are not properly illuminated and imaged, the result is apt to be errors in reconciling and balancing check transactions and in reporting to customers (e.g. monthly statement).

Workers recognize that electronically-stored data ("electronic images") can be processed much quicker, more reliably and less subject to error. But to do so, one must first capture an accurate image, or modified image, of the physical document and convert this into electronic computer (EDP) signals. The EDP image-signals can then be manipulated (e.g. be reproduced for visual review, be sorted and distributed, etc.) much more rapidly, easily and reliably than physical documents.

Current systems contemplated for "electronic image-lift" teach using a video camera by which an operator views the front and back of the actual document as desired. Based on what he sees, the operator can electronically enter document-data into a computer system; e.g., such things as check-amount, account number and other data necessary for processing document transactions. Such physical viewing is labor-intensive, is subject to error (e.g. from operator fatigue) and is substantially slower than an automated image-capture arrangement.

Workers are beginning to think of using imaging technology as a way of improving document processing, as disclosed, for example, in U.S. Pat. Nos. 4,510,619; 4,205,780; 4,264,808; and 4,672,186. Generally, imaging involves optically scanning documents to produce electronic images that are processed electronically and stored on high capacity storage media (such as magnetic disc drives and/or optical memory) for later retrieval and display. It is apparent that document imaging can provide an opportunity to reduce document handling and movement, since the electronic images can be used in place of the actual documents.

It would be somewhat conventional to think of document processing with "image capture" using video cameras, with two light sources, one to illuminate each side of a document, plus various lenses to focus light onto the document. Successive document-images ("image slices") can be reflected from the document, front and back, into respective video cameras. These can convert the optical image into electronic signals; which can then be converted by appropriate circuitry into digital form. But the foregoing would have serious disadvantages; e.g. it would require two light sources and two camera systems—something expensive to provide and cumbersome to coordinate.

This invention addresses such disadvantages; e.g. teaching use of a single, high-intensity, well-cooled light source (cf. high-output xenon bulb, requiring substantially less power than a two-lamp system); and mounting the light source and associated optical components on a single base, and under a document transfer track, for ready access (e.g. for maintenance) and for better thermal isolation. Also, the taught system is modular (e.g. to plug-in to a relatively conventional sorter); it simplifies service and manufacture using interchangeable, easily-installed components. The system disclosed uses randomly-distributed fiber optics and electronic image conversion means in a high speed, automated "image-lift" system; e.g. one capable of accommodating the present advanced needs of financial institutions for document processing.

An object hereof is to address at least some of the foregoing problems and to provide at least some of the mentioned, and other, advantages.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIGS. 4, 5 showing in partial-perspective certain submodules thereof;

FIG. 12 is a diagram indicating functionally, a preferred construction of a Fibre Optic bundle portion of this embodiment; while FIG. 14A gives specifications for such a bundle.

FIG. 17 is a partial, side-section of the illumination-optics of the embodiment; while

while

FIG. 21 is a side-section of an Energy-Dump portion of this embodiment; with an upper portion thereof shown in FIG. 22; a plan view of some "vanes" thereof shown in FIG. 23 (and front-view in FIG. 24); while

FIG. 26 is a partial side view of some illumination optics; while

FIG. 27 is an exploded perspective of a mount casting for elements of the embodiment (with elements thereon exploded-away); while

FIG. 30 is a schematic plan view of such imaging-optics; while

FIG. 35 is a plan view of Front and Rear illumination optics, showing the light-paths.

DESCRIPTION OF THE PREFERRED EMBODIMENT

Exemplary use

Before giving more details of the subject image-lift embodiment, it will help to indicate an examplary use-environment in which such an embodiment can be employed. Such is the document handling arrangement we show in FIGS. 1-8 (called "System DH"). System DH will now be very briefly summarized. The methods and means discussed herein, will generally be understood as constructed and operating as presently known in the art, except where otherwise specified; likewise all materials, methods, devices and apparatus described herein will be understood as implemented by known expedients according to present good practice.

Figure 1:
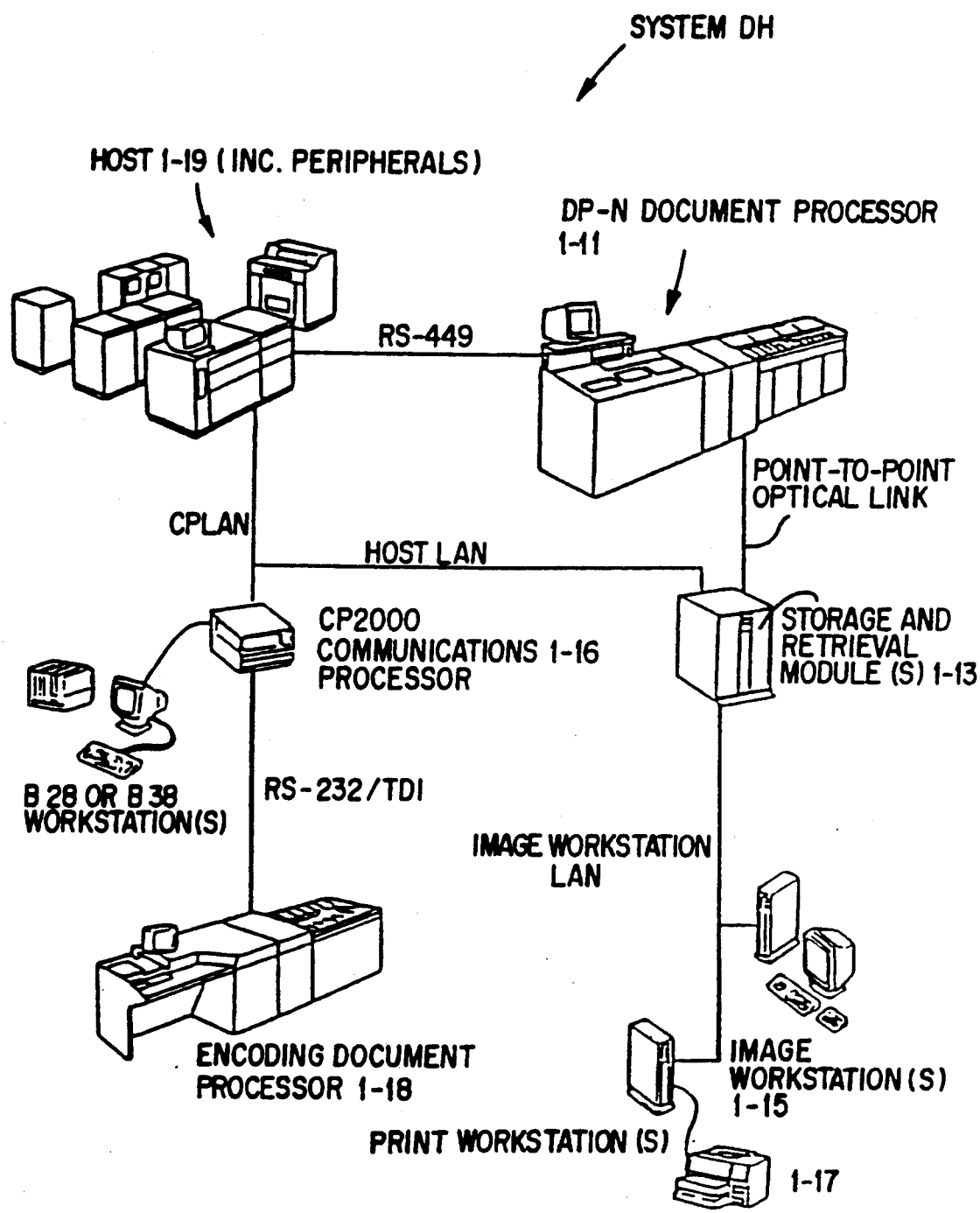
FIG. 1 is a perspective schematic idealized configuration of an entire Document Handling System DH apt for using our invention.

In FIG. 1, System DH may be seen to comprise a Document Processor 1-11 (also called DP-N) coupled to a Host Computer system 1-19 and one or more Storage/Retrieval modules (SRM) 1-13. Workers will understand that documents (e.g. checks, etc.) are to be fed into Processor 1-11 and rapidly transported thereby past various processing-stations (e.g. microfilm and imager as described below) to wind-up in one of several sort-pockets (see FIGS. 2-8). An "Electronic-image" of each document is "lifted" and sent to a designated SRM 1-13 or storage (e.g. on disks, as known in the art). The SRM(s) communicate with Host 1-19 and with various Workstations (e.g. one or more Image Workstations 1-15; a Print Workstation 1-17). System DH also includes an Encoder 1-18 (e.g. to imprint MICR characters on checks) and related communications and workstation units.

Figure 2:
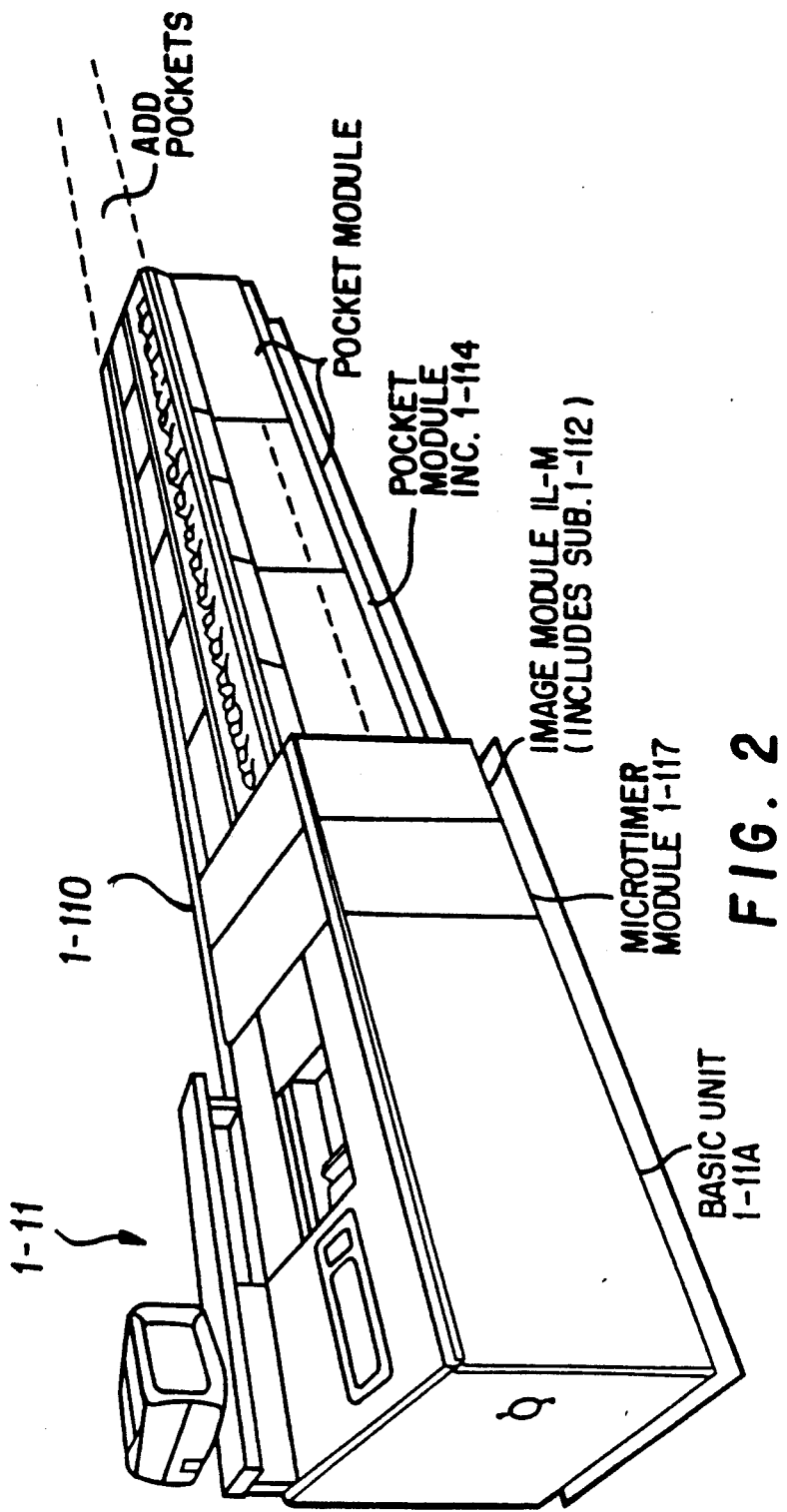
FIG. 2 is an idealized perspective of a Document Processor portion of this system DH; with FIG. 3 showing portions thereof in side view and very schematically.
Figure 3:
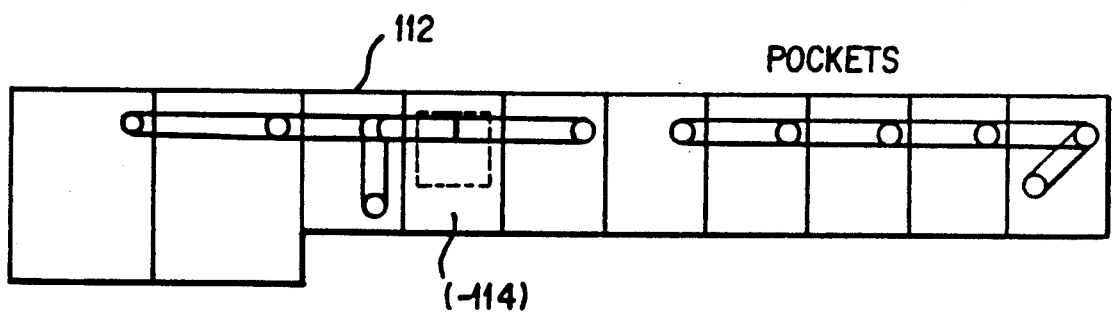
Figure 5:
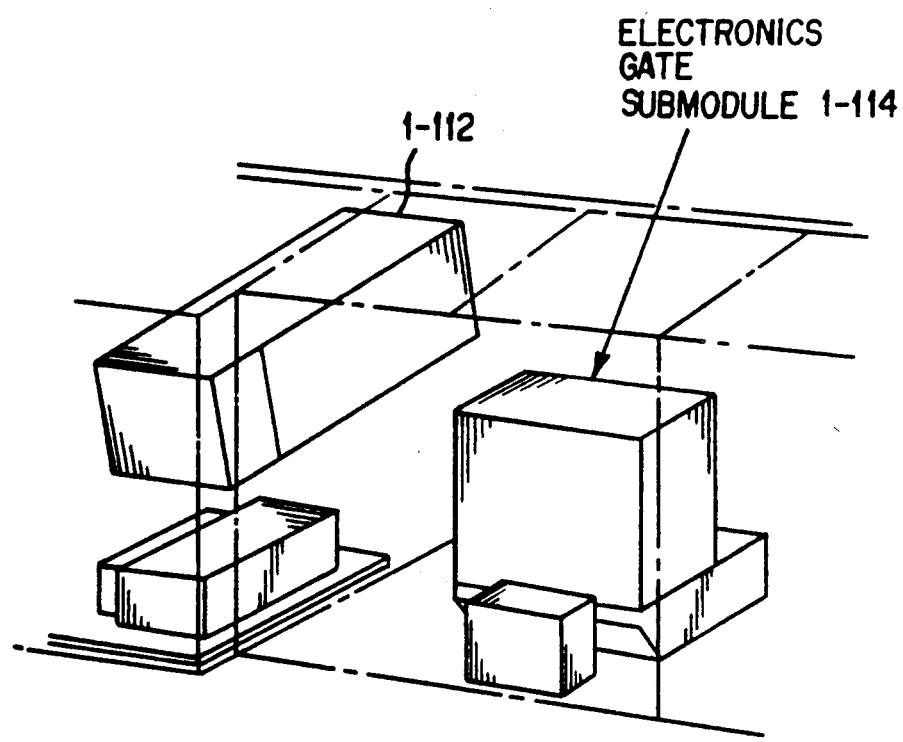
Figure 6:
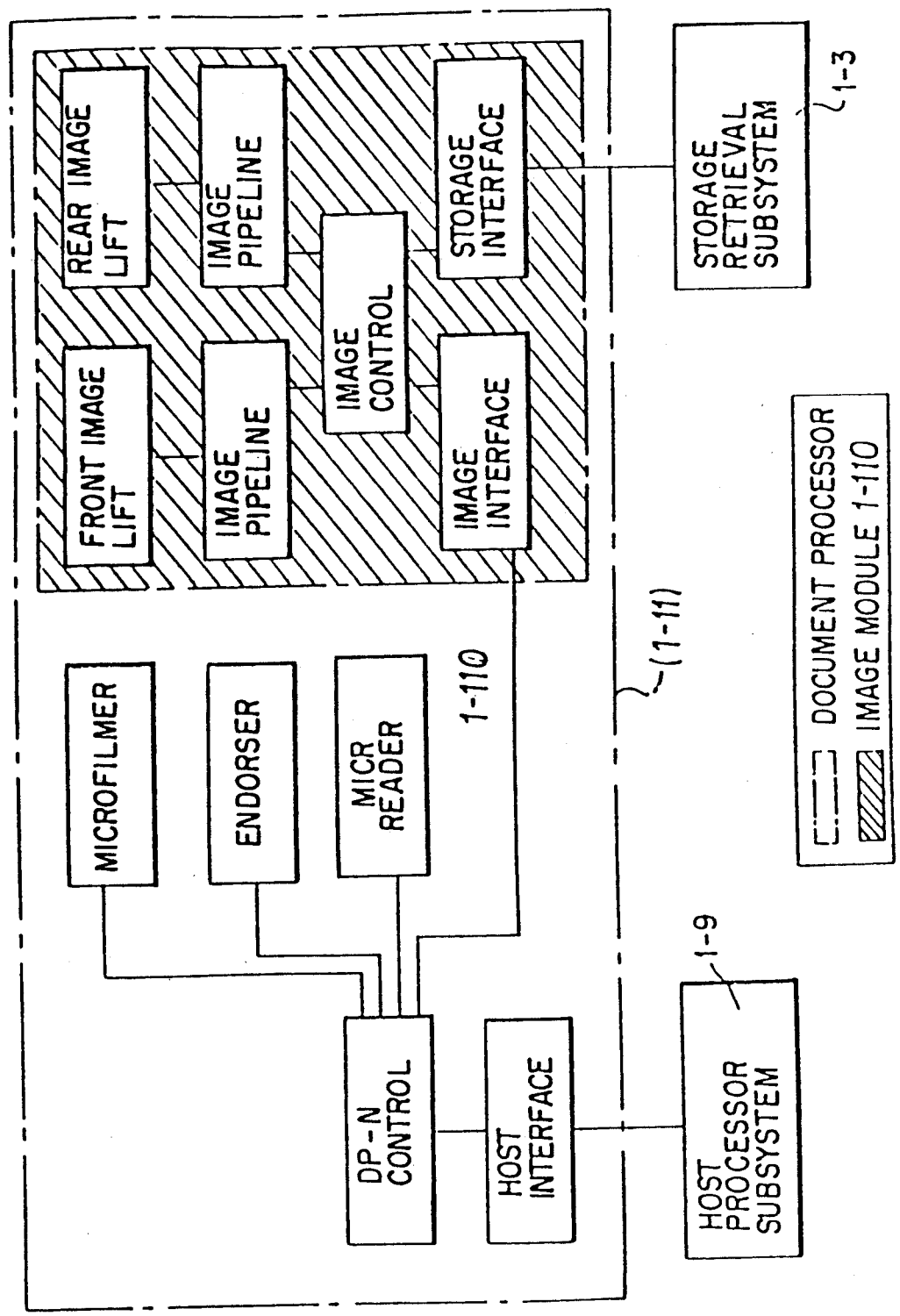
FIG. 6 is a block diagram showing functional units of this Document Processor; while FIG. 7 diagrams image-signal flow therein.
Figure 7:
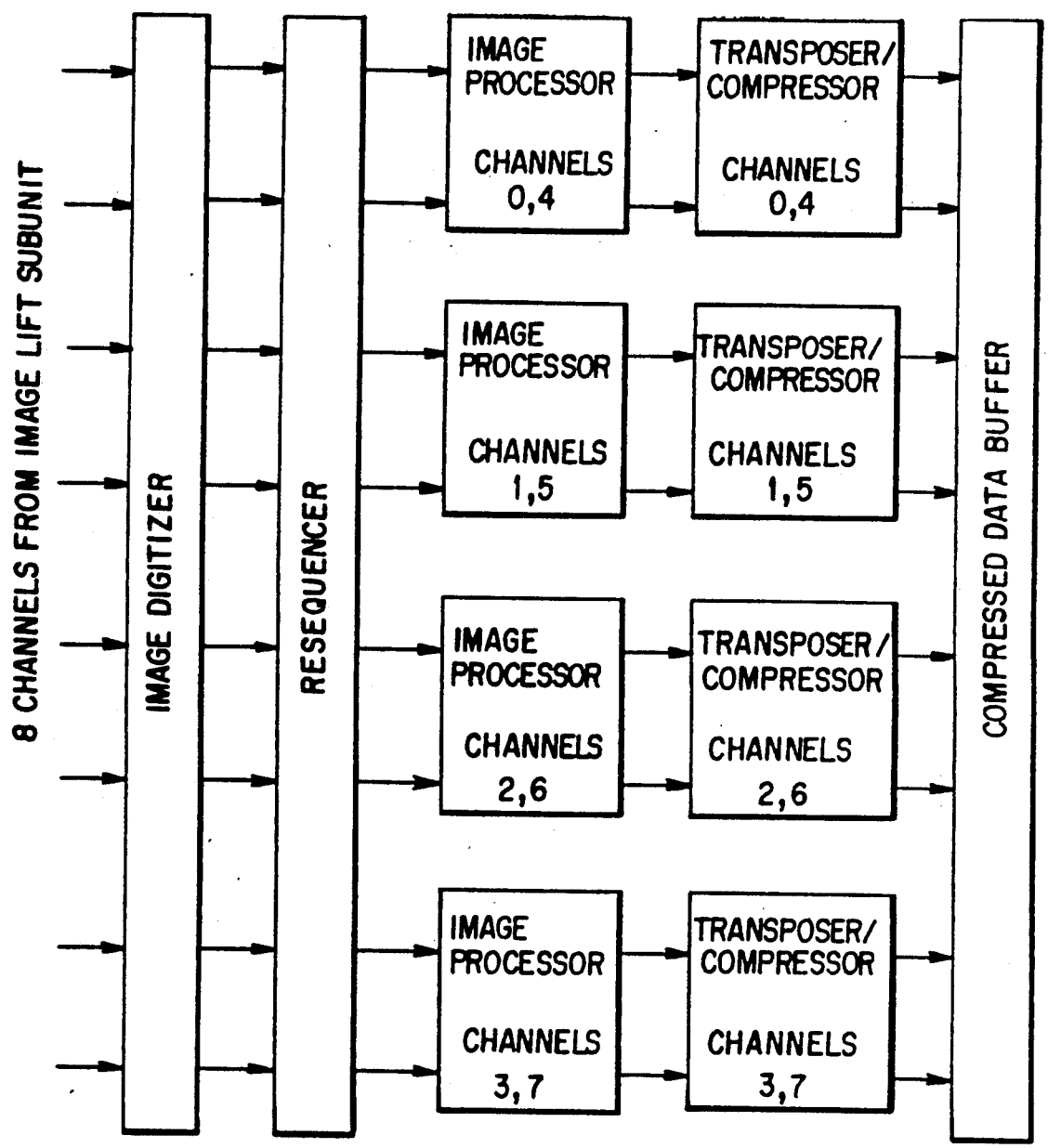
Figure 8:
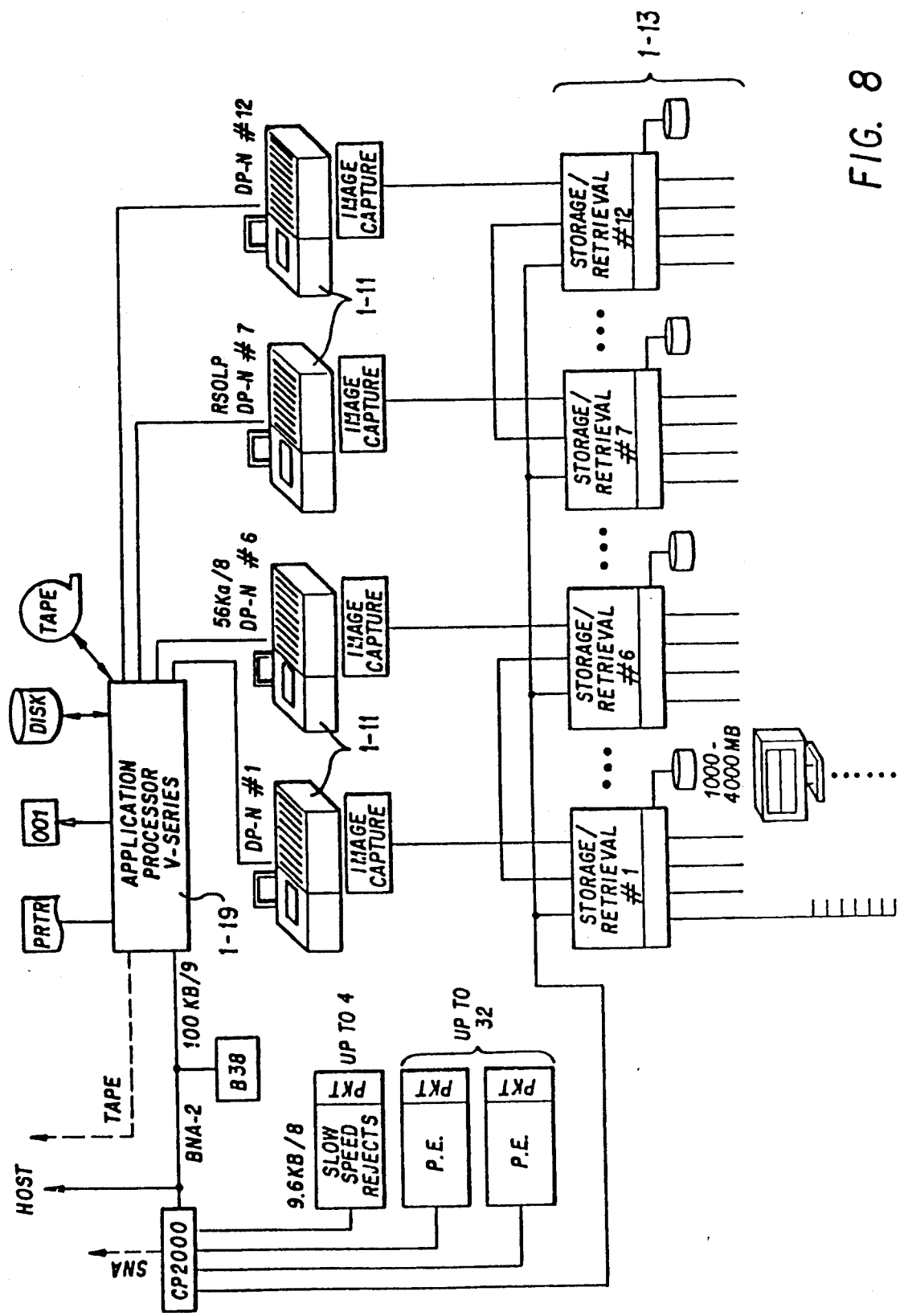
FIG. 8 is a block diagram in the fashion of FIG. 1, showing a number of such Document Processor.

FIG. 2 indicates sub-units (modules) of Sort/Processor 1-11, including an image-lift camera module 1-112 and associated electronics submodule 1-114 (see FIGS. 4, 5). FIG 3 indicates this in schematic side-view. FIG. 6 very schematically (block-diagrammatically) indicates imaging and other functional units; while FIG. 7 schematically indicates how some image-lift signals are processed. FIG. 8 indicates, schematically, the possible use of a number of Sort-Processors 1-11 and Storage Modules 1-13.

Document images are to be captured at the real-time sorting speed of the document processor. For high-speed document processors, the sorting speed is at least 1800 documents per minute (300 inches a second, track speed); lower speed document processors sort documents at proximately 1000 (or less) documents a minute (e.g. 150 inches a second, track speed). Acquiring electronic representations of documents traveling at these speeds is a real challenge and requires specialized hardware and software.

Now, we will briefly outline how a preferred image-lift embodiment works; and thereafter take-up various sub-units thereof in more detail.

Embodiment A, in general

Figure 9:
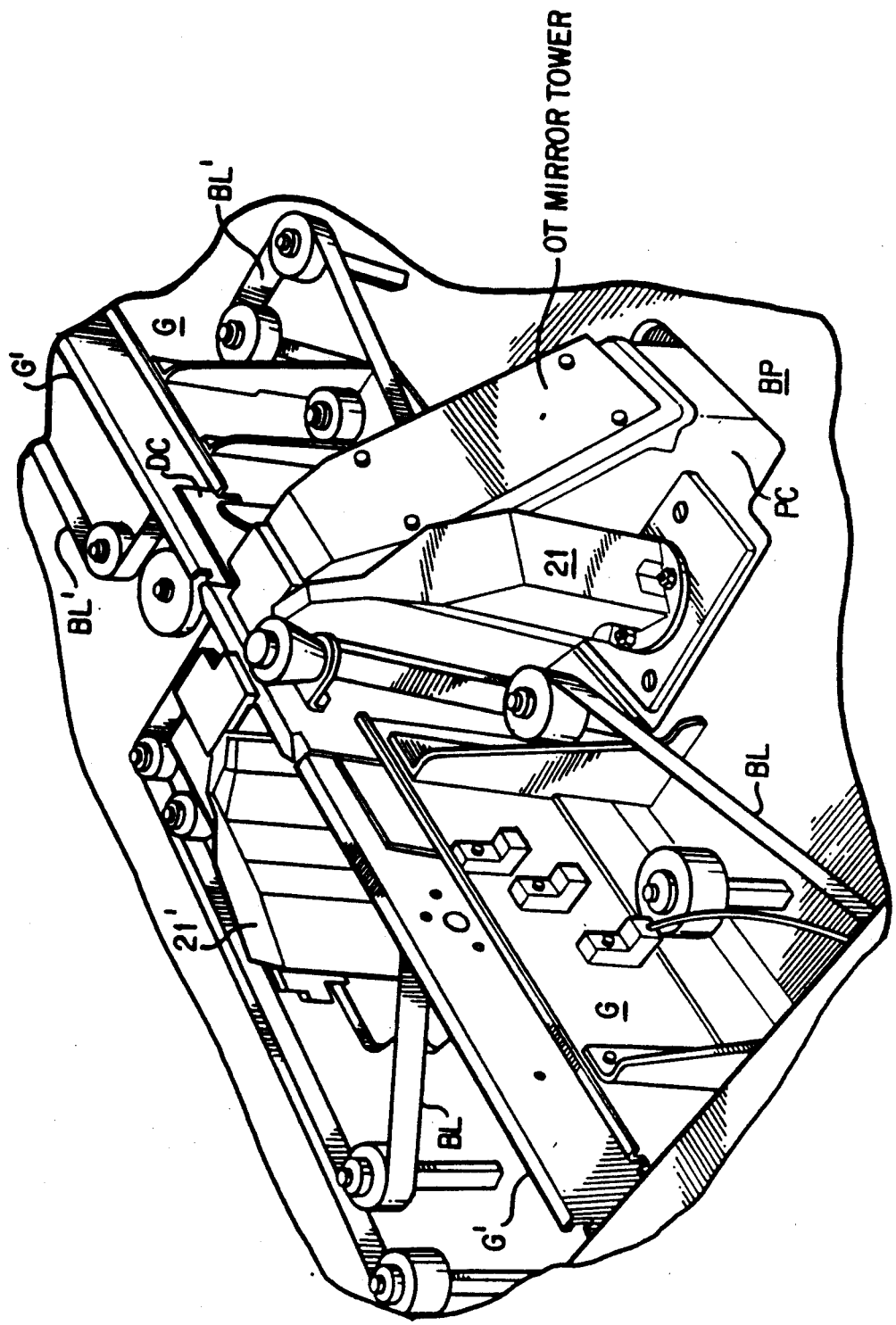
FIG. 9 is an upper perspective view of a portion of an Image-Station embodiment, with a different view in FIG. 9A and with portions thereof schematically indicated in the plan view of FIG. 10 and the illumination-optics thereof very schematically (functionally) indicated in FIG. 11.
Figure 10:
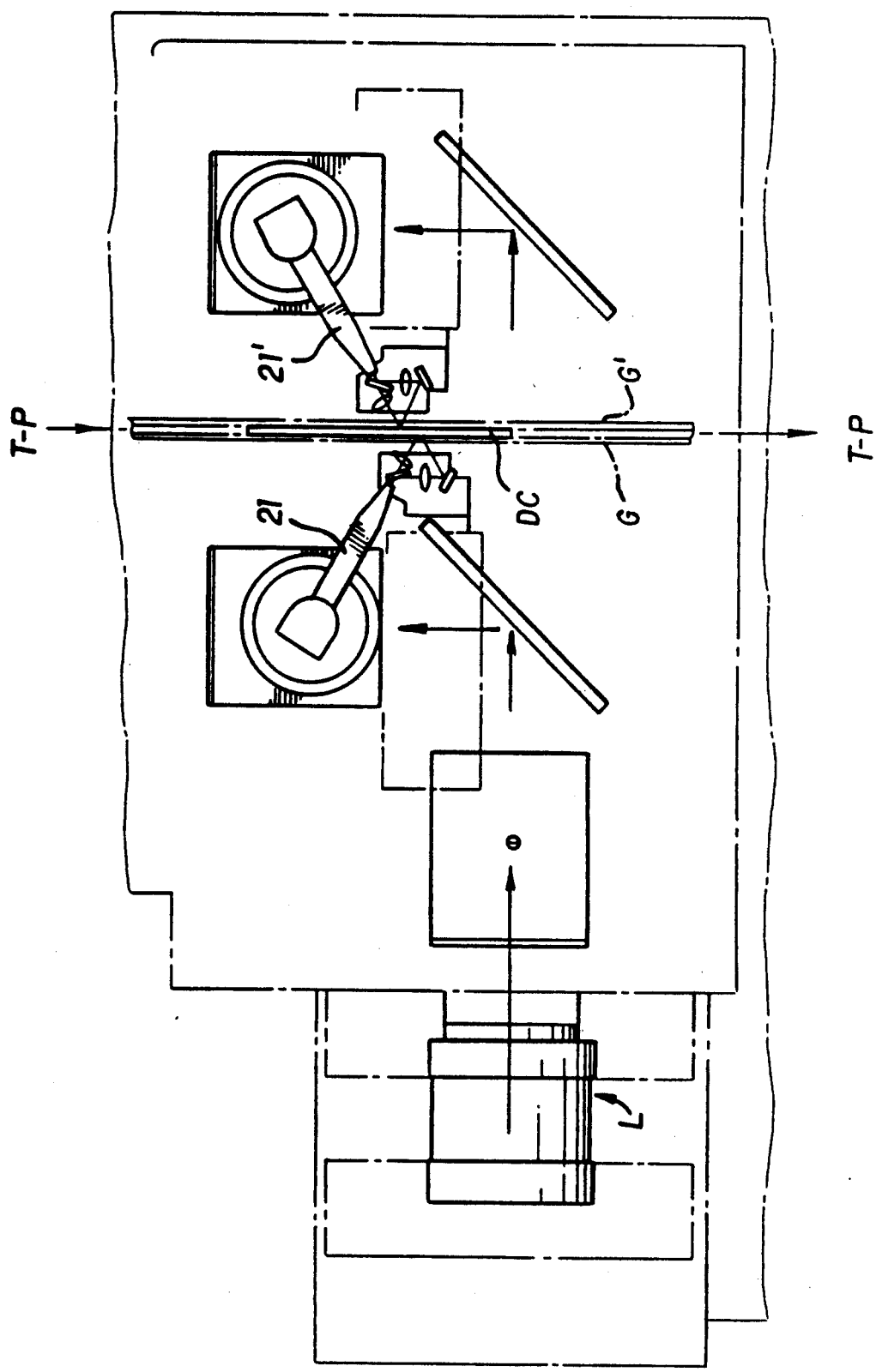

In general, it will be seen that our preferred "image-lift" arrangement is adapted to be incorporated, as a module IL-M, into a high-speed document processor, such as Sort Processor 1-11 (see FIGS. 3, 4, 5 and associated description). Here, the "image-lift" is performed just upstream of the sort-pockets: (e.g. see FIG. 4, camera 1-112 in Module IL-M). FIGS. 9, 10 show a portion of the document transport means for Module IL-M (belts BL, BL' cooperate with track-defining guides G, G', between which a document DC is driven past the Front/Rear illumination/imaging stations). For example, see simplified FIGS. 11, 31 for a functional showing of an illumination-path, and an imaging-path, respectively; and also see FIG. 10 where each such "imaging station" may be understood, generally, as sited where the two illumination beams, from illumination-fibre bundles 21, 21', intersect.

Figure 9A:
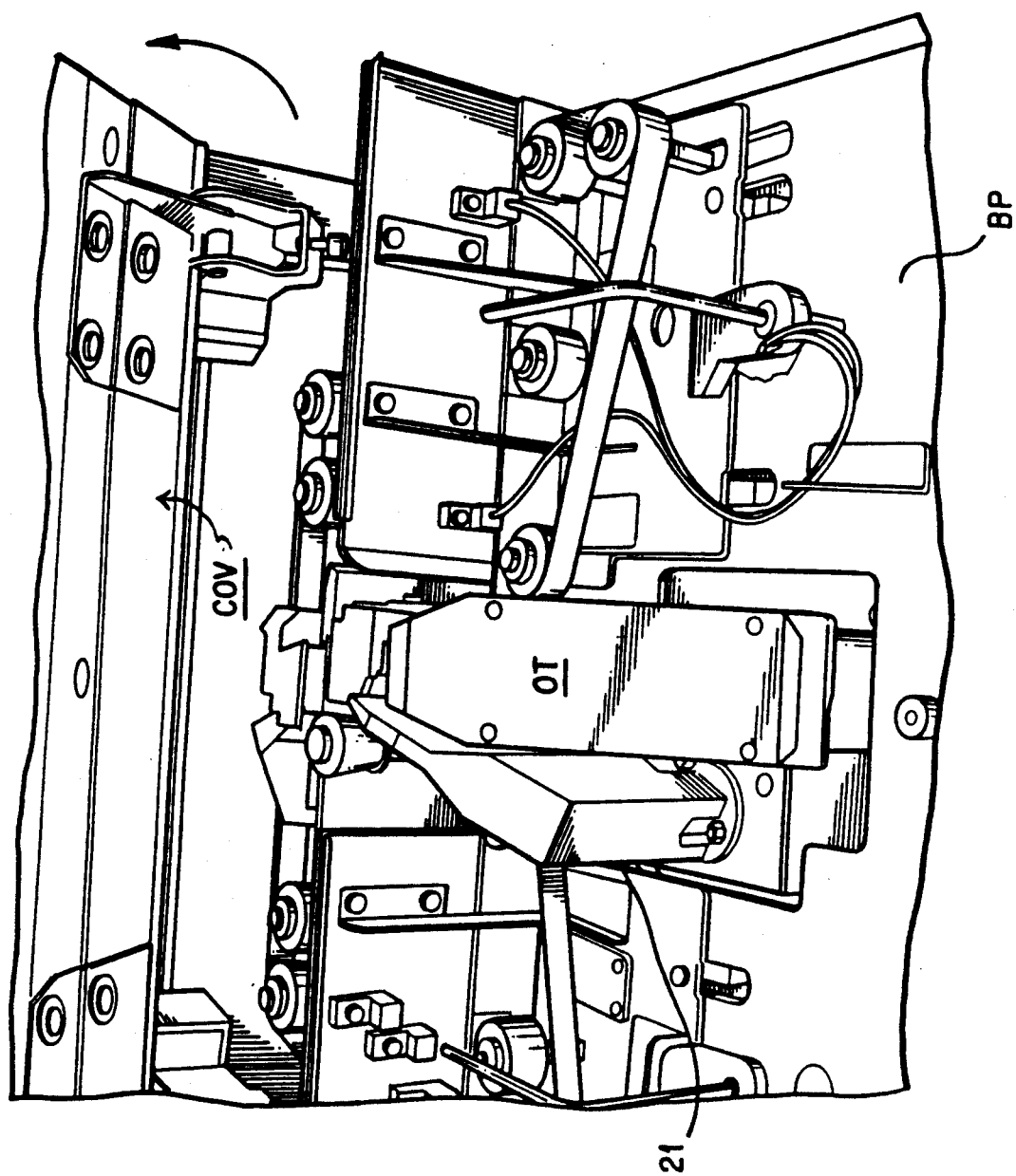

The document transport in module IL-M is adapted to move documents past front/rear like slits (SL-F/SL-R), or image windows—; these being offset from one another along the transport path T-P (again see FIG. 10 and note how the Front and Rear dual-beams intersect path T-P at two different points). Associated, respective Front/Rear imaging-paths capture an image of a document's respective front and rear faces. The document transport system of module IL-M is adapted to translate documents, non-stop, past these slits SL at 300 ips (inches per second). Thus, at the respective points of "image-capture", the opposing track walls G, G', are broken by the cited illumination/readback slits SL. Each slit SL is filled with glare-resistant glass to thus keep documents from bending into it, or being snagged thereby [also see front view in FIG. 9A].

The documents are translated along this prescribed transport path T-P so the front and rear images may be captured, in focus (FIG. 35). The system uses a pair of linear-array CCPDs (charge-coupled photo-diodes, e.g. see FIG. 33) as camera means.

The illumination source (see FIG. 11) is preferably a single, high-output, high-intensity xenon lamp X-L (e.g. 1000 watts), encased in a heat sink H-S (e.g. FIGS. 11, 17) and fan-cooled. Its beam is filtered by a "hot mirror"/"energy-dump" combination 2-1/E-D (this mirror, or infrared-reflector, 2-1 diverts the IR component to a special heat-dump E-D). Then, the rest of the beam goes to a beam splitter 2-3, which passes half the illumination to a Corner mirror 2-5 and reflects half to an illumination mirror 2-7'. Mirror 2-5 reflects its beam to a like illumination mirror 2-7, which, in turn, diverts its beam (this will illuminate the document Rear) through an illumination lens 2-9, onto an associated "Rear fiber-optic bundle" 21. The fibers of bundle 21 convert the circular input-beam to an elongate rectangular output-beam (light bar). This "light bar" is projected (focused) through an associated rear slit in track guide G and onto the Rear side of each passing document.

The half of the light beam which Splitter 2-3 reflects to mirror 2-7' will illuminate the Front of documents; this beam is focused through an associated illumination lens 2-9' onto a second "Front fiber-optic bundle" 21' (like bundle 21). Bundle 21' projects a similar "light bar" through its associated Front slit SL-F onto the Front side of passing documents.

Thus, the output of each fiber-optic bundle 21, 21' is a narrow, rectangular high-intensity beam of light—thus yielding opposed, offset illumination beams onto offset Front/Rear slits SL-F, SL-R and onto the Front and Rear of a passing document (see FIGS. 10, 35; note beams from fiber-optic units 21, 21').

Figure 36:
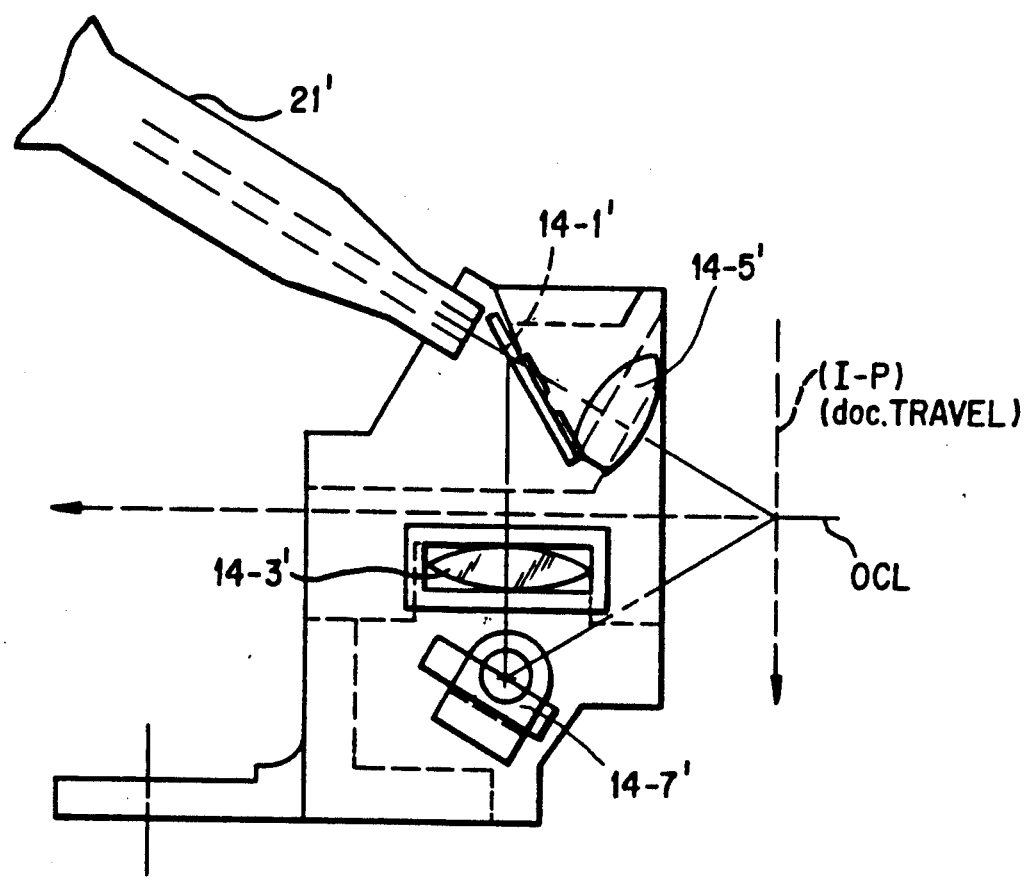
FIG. 36 is a like showing of part of the FIG. 35 assembly.

Each beam from fibre bundles 21, 21' is, however, further divided (see FIGS. 10, 35, 36) using beam-splitters and associated optics to produce a "dual-symmetrical-oblique" illumination beam on each side of the document (as opposed to a more conventional single beam). We have found that such a pair of symmetrical, oblique beams (e.g. $\pm 30°$ from the Normal is preferred) will reduce or eliminate distortion, shadowing etc. of the captured image that results from such things as creases and folds in a document—something very important with financial documents whose surfaces can vary widely and can present imperfections and folds which distort or degrade the image (taken by a CCPD). Each set of dual-beams is focused onto a respective image slit SL to optimize illumination of its respective document-side and thus enhance image-capture.

Figure 30:
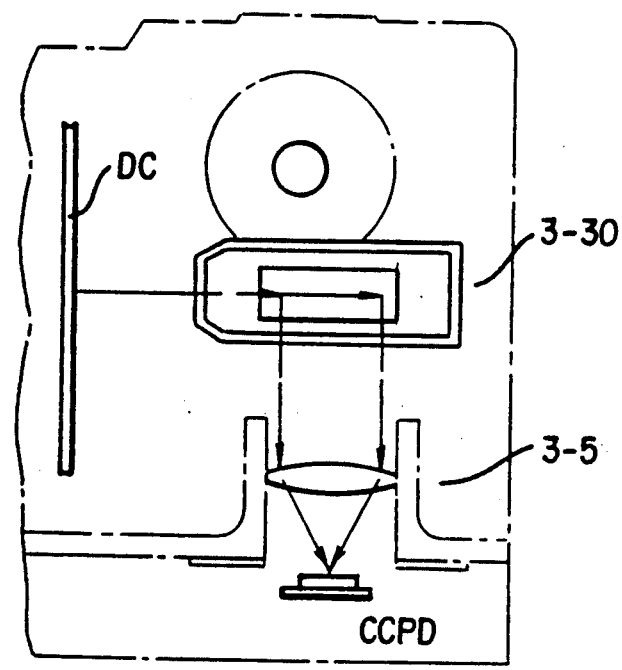
Figure 31:
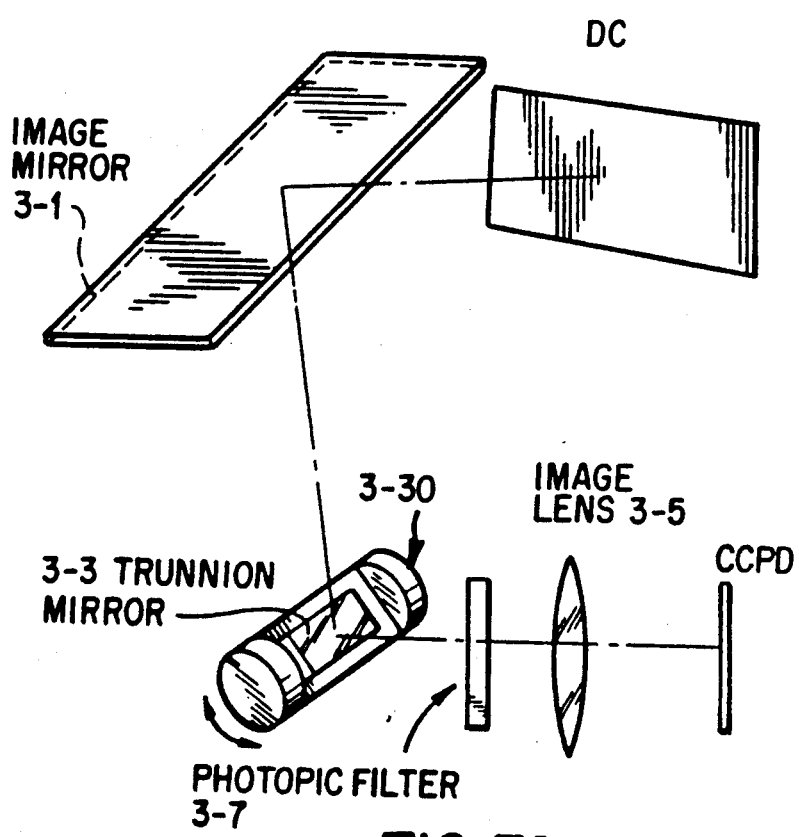
FIG. 31 shows the elements in a functional diagram.
Figure 33:
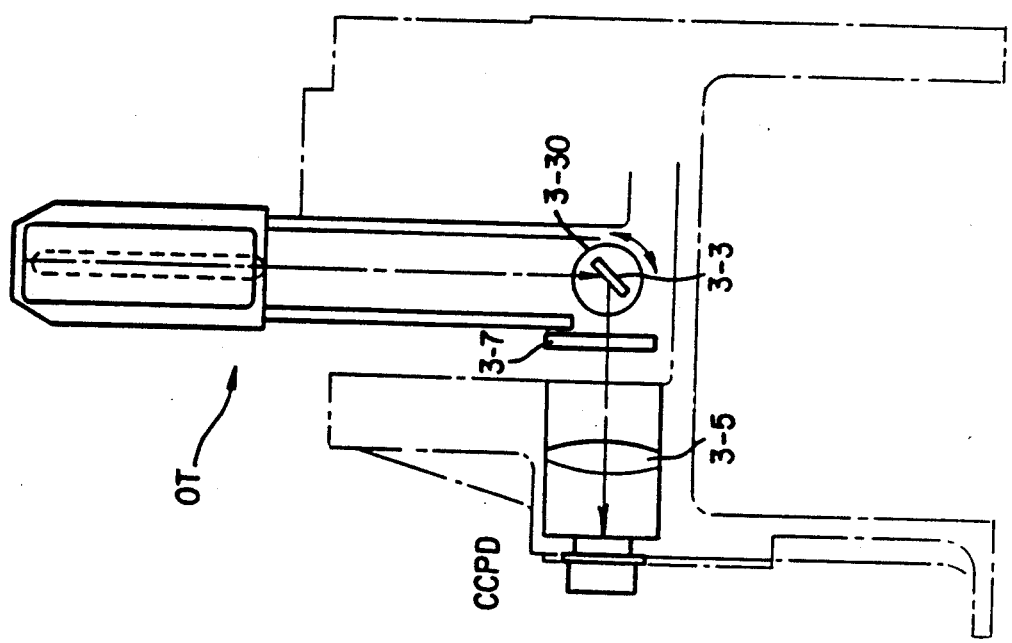
FIGS. 32, 33 show these elements, selectively and in side-section.
Figure 32:
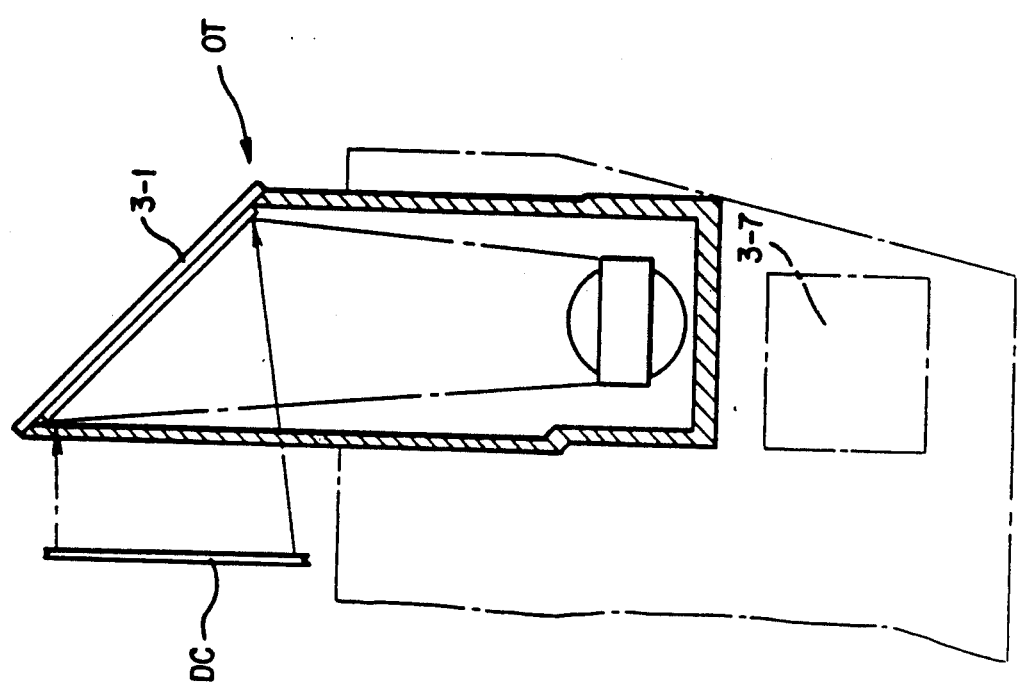

The two illumination-beams are, therefore reflected from a respective face of a passing document to yield a pair of (Front, Rear) "image-beams", each being conducted to respective "CCPD camera" (CCPD, CCPD', see FIGS. 30, 32, 33). Each of these rectangular images will be understood as emanating from the "document-slice" its slit produces, being taken along the "normal" to the document-face. One of the two like image-beams is now described. The image-beam is sent ot an "image-mirror" 3-1 (FIG. 31), arranged and disposed to divert the beam downward (see FIG. 32) to strike a rotatable Trunnion mirror 3-3. Mirror 3-3 is mounted on a rotating semi-cylindrical Trunnion 3-30, and diverts the beam through a special "photopic filter" 3-7, then an image lens 3-5 which focuses it onto the respective CCPD surface. The CCPD converts the image into an electrical analog signal which is sent to data processor means for conversion to digital pulses (as known in this art).

Some critical factors of the foregoing illumination/imaging arrangement are the following:

Mounting angle and optical properties of Beam Splitter 2-3 to ensure a 50/50 light distribution (front and rear); adjustability and stability of the trunnion mirrors to keep their image-beam centered on their CCPD; adjustability and stability of each image lens to keep its image-beam focussed on its CCPD; the spectral output of the lamp XL; the position of each illumination lens 2-9, 2-9' (FIGS. 17, 26), to so dimension their beams onto their fiber-optic bundles as to give "matched" output beams of the same, calibrated intensity; the "winding" and randomized output of the fiber-optic bundles, 21, 21'; the optical characteristics of the "photopic filters"; and the Filter Response of the Hot Mirror and photopic filters (deviation from a prescribed response will degrade image quality i.e., color response). These factors should be coordinated to produce images of satisfactory quality and accuracy, as will be further discussed.

Details of Camera Submodule

Turning to our preferred imaging (camera) module embodiment (cf. 1-110 FIG. 2, etc.), note that, in general, the hardware and interfaces comprise: an Image Lift Subunit, an AC Power Distribution Unit, a Power Control Module, a Lamp power supply, Track components, Internal and External interfaces.

The document transport track of the Camera Submodule has physically independent front and rear guide walls. They are made of metal and have removeable glass inserts. (The entire front guide wall assembly may be removed.) The center (glass-in-slit) portion of the walls is named the optical gate. The gate walls at the optical gate (slit) are approximately 0.080 of an inch apart (slits).

Light output by each (Fr., R.) Symmetrical Lighting assembly is focused through its optical gate onto the passing document (front, rear).

The guide walls are equipped with a release mechanism that opens them approximately three inches. The release mechanism consists of an L-shaped handle and a track-open safety switch. Turning the handle counterclockwise opens the guide wall, turning the handle clockwise closes and locks the guide wall. If the guide wall is not completely closed, the track-open safety switch sends a signal to the AA logic gate on the document processor. The track-open safety switch is located directly to the rear of the guide wall release handle.

The left guide wall has one beam-of-light (BOL) document detector; the right guide wall has two BOLs. The BOLs trace the progress of documents through the Camera Submodule's document transport track.

Each BOL has a light source on one side of the document path and a sensor (phototransistor) on the other side of the document path. These sensors are aligned with the light source. As documents pass through the BOLs, they interrupt the beam of light. Document detection status is interpreted by the document processor.

Mechanical drive for the document transport track of the Camera Submodule is supplied by the document processor through a mechanical belt and pulley system. The Imaging Module is the last module before the pocket modules. Because of this configuration, the Imaging Module can be installed into an existing DP-N (Unisys) Document Processor. The addition of an Imaging Module reduces the number of pocket modules that can be driven by the first control module from four to three. With an Imaging Module installed, the second control module drives five modules instead of four. FIG. 9 illustrates the mechanical configuration of the Camera Submodule document transport track.

The Image-Lift unit performs image acquisition and includes: a lamp-cooling fan unit, an electronic camera PWBA assembly, a pair of fiber-optic-optic-tower assemblies, with lenses, mirrors, etc. and a mount-casting for the latter assemblies.

The Image Lift Subunit is attached to the document transport mount and contains the mechanics, optics and electronics necessary to acquire images of documents at the real-time processing speed of the Document Processor 1-11. Images of documents are captured, in real time, as they pass through Processor 1-11 at vey high speeds (prefer 300 inches per second). The Image Lift Subunit, as above-noted, acquires document images by illuminating both document sides and capturing an electronic image of each.

Figure 11:
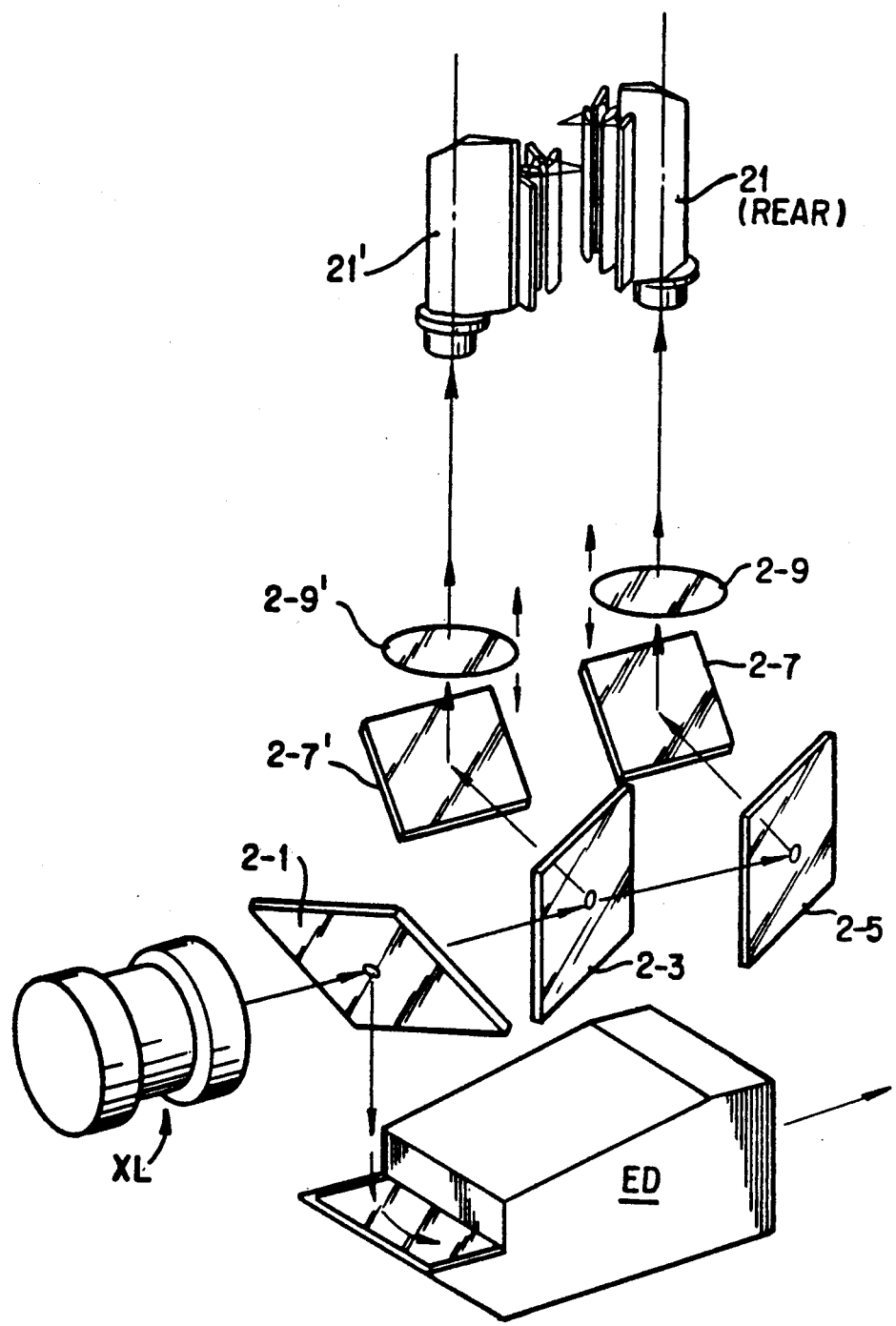
Figure 17:
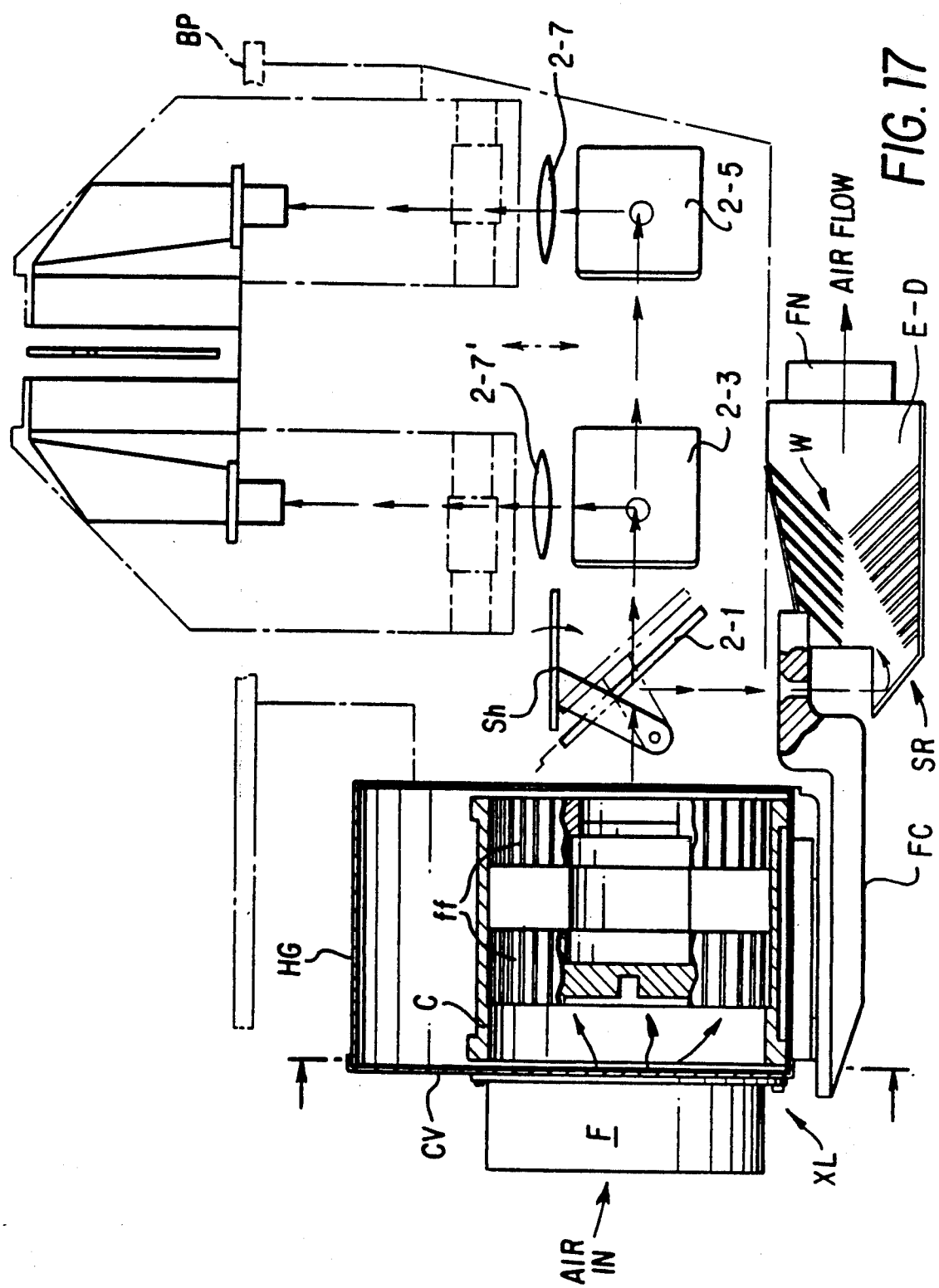

Illumination elements (FIGS. 11, 17)

High intensity light is output by a high-pressure lamp XL thru an aperture S. The light immediately encounters an infrared-removing mirror ("Hot mirror") 2-1 which filters-out the infrared component and reflects it to an Energy-Dump E-D, where it is dissipated as heat (FIG. 11); [Note: excessive infrared can degrade the sensors and interfere with imaging].

Figure 18:
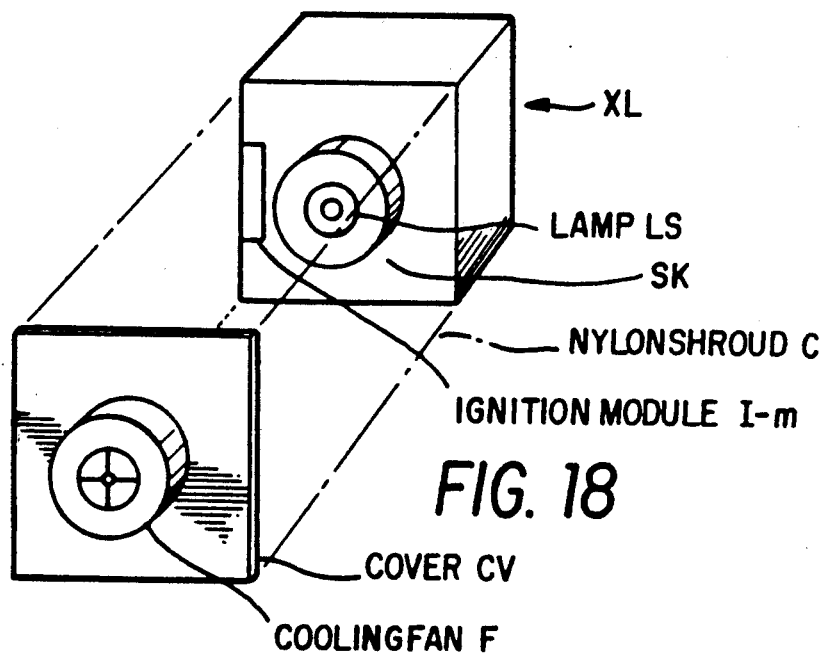
FIG. 18 is an exploded diagram of the lamp-housing sub-section thereof.
Figure 25:
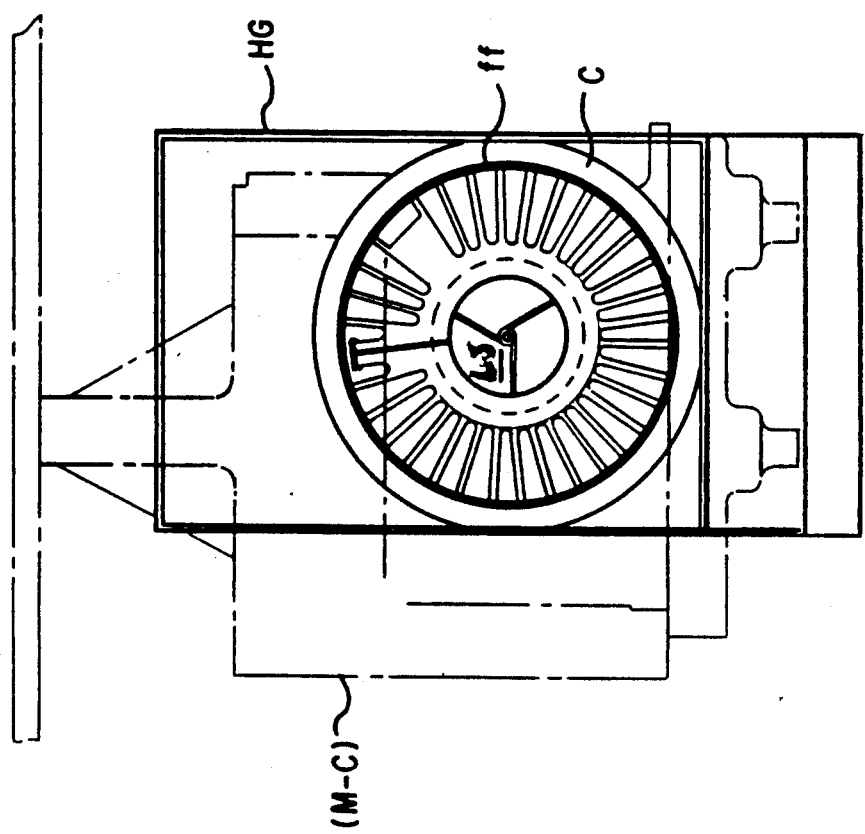
FIG. 25 shows the lamp assembly thereof in partial elevation.

Light source XL preferably comprises a 1000 Watt, high-output, commercially-available xenon lamp bulb LS. Bulb LS (FIGS. 18, 17, 25) preferably draws 32 to 50 amperes at 20 volts (with a voltage rise of 30 KV. during initial ignition) and is mounted in a housing HG including an imaging-aperture S through which its light output is projected (onto mirror 2-1 etc.) A cooling fan F (FIG. 17) is placed opposite slit S, while the bulb LS itself is surrounded by a heat sink SK (including fins ff) of cast aluminum. Heat sink SK defines an inner cylindrical space surrounding, and contacting, bulb LS to conduct heat away. The outer surface of SK exhibits radial fins ff which are surrounded by a plastic container C. Cooling air is thrust by fan F across fins ff of exit through exit-slots ES disposed all about housing HG, and around slit S. This gives a continuous flow of air for cooling the lamp bulb LS.

The Lamp Assembly XL (refer to FIGS. 17, 18) is in a sheet-metal box HG that houses the lamp LS, the heat sinks SK and a Lamp Ignition Module I-m. The cooling fan F is secured to the cover CV of the box.

The Lamp Assembly and cooling fan are both field-replaceable units. For example, if a lamp or Lamp Ignition Module malfunctions, one unscrews the cover and replaces the box (and all its contents); one then reattaches the cover and cooling fan.

Cooling fan F has a rotational sensor that monitors its performance. If the fan fails, lamp LS is at risk of overheating and failing. In addition, fan F always turns when the document processor is on, to thus ensure cooling of the lamp even if the Imaging Module is powered-off.

The Lamp Assembly is attached to the Image Lift Subunit. Light exits through a hole S in the rear of the Lamp Assembly into the front of the image lift. This mechanical interface is covered by a cylindrical urethane seal 4-7, which ensures that dust and debris do not enter the Image Lift Subunit (e.g. see FIG. 18).

Lamp LS is a 1000-watt, short-arc, high-pressure (Xenon) device that requires 32 to 50 amps of current to operate. The amount of current required is dependent upon the age of the lamp and the intensity required of it. (Newer lamps require less current to operate.) Lamp LS does not operate correctly with less than 32 amps of current.

The intensity of lamp LS is controlled by Imaging Module software through the Diagnostic and Transport Interface and Lamp Control PWBAs. As the lamp ages, additional current is supplied to it to compensate for its aging process. The intensity of the lamp is to be thus held constant throughout its lifespan.

Lamp LS is held in place by heat sink assembly SK, which helps dissipate the heat energy generated. The lamp has an estimated lifetime of 2000 hours. (Its life expectancy decreases slightly each time it is powered-on.) A Lamp Ignition Module I-m (FIG. 18) provides starting voltage; it produces a 30 kilovolt pulse at approximately ½ second intervals.

Figure 34:
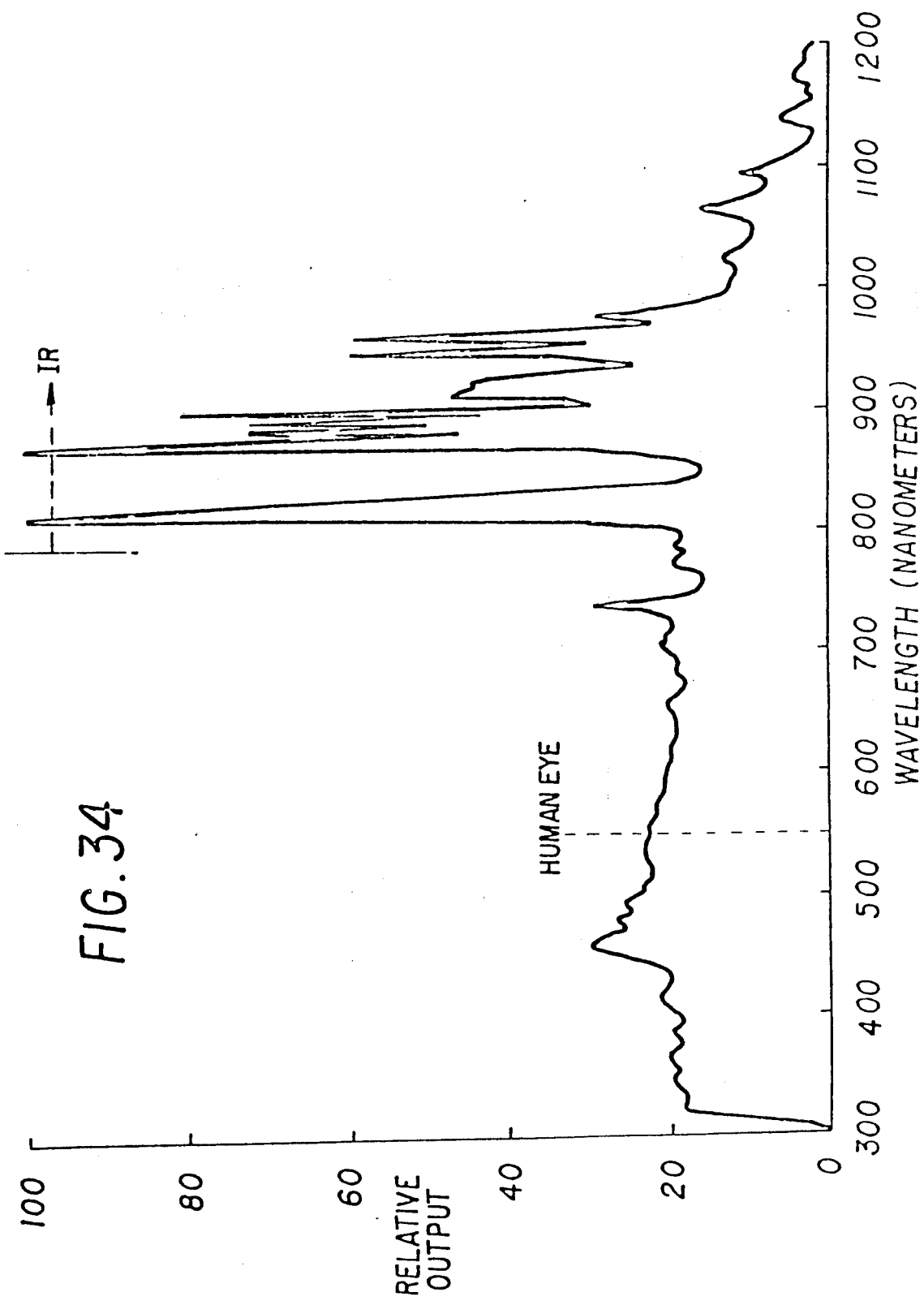
FIG. 34 is a plot of lamp intensity vs wavelength, while FIG. 34A plots spectral response of the embodiment camera elements with that of the typical human eye.

FIG. 34 generally depicts the (ideal) spectral output of such a lam LS, giving intensity vs wavelength.

Figure 21:
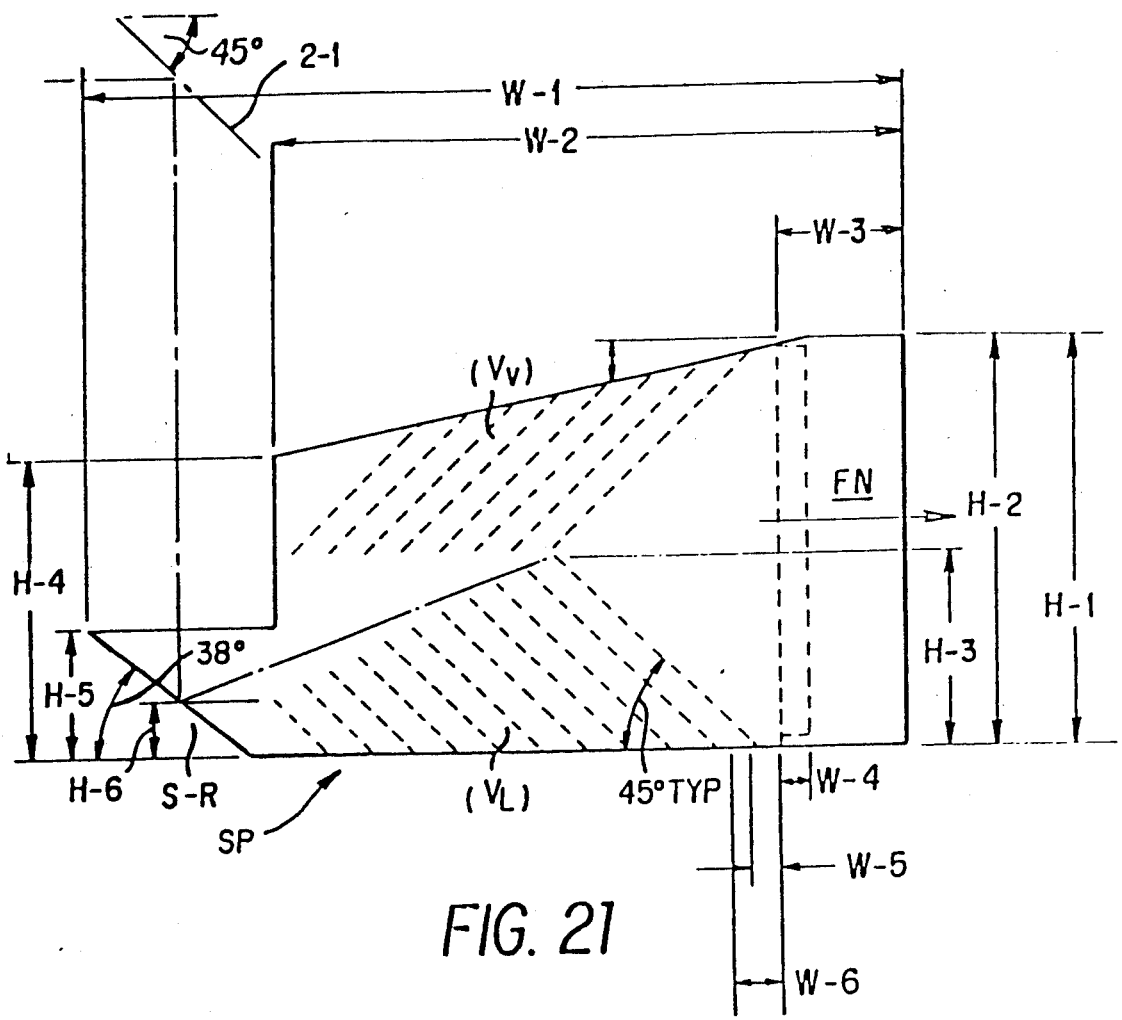
Figure 22:
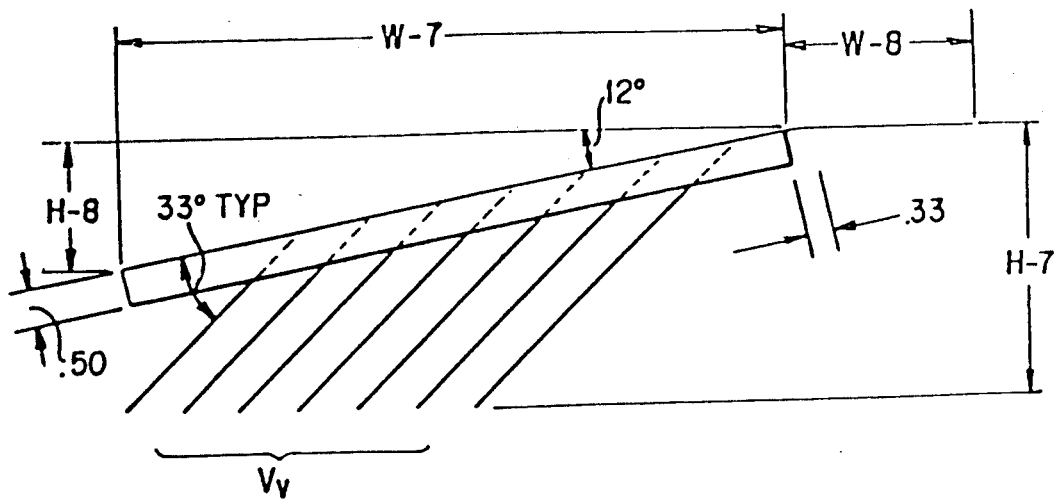
Figure 24:
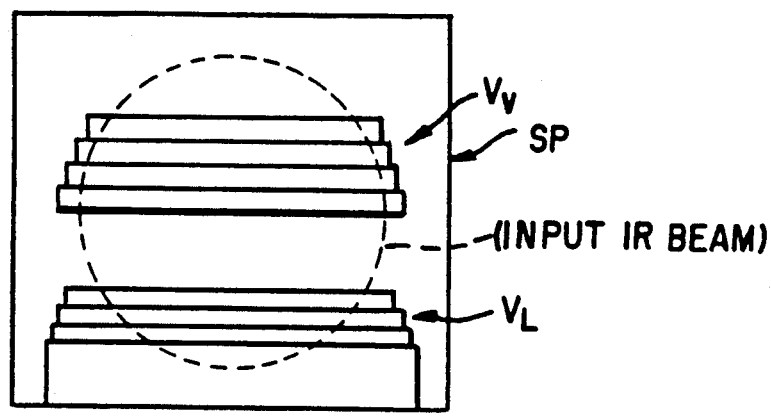
Figure 23:
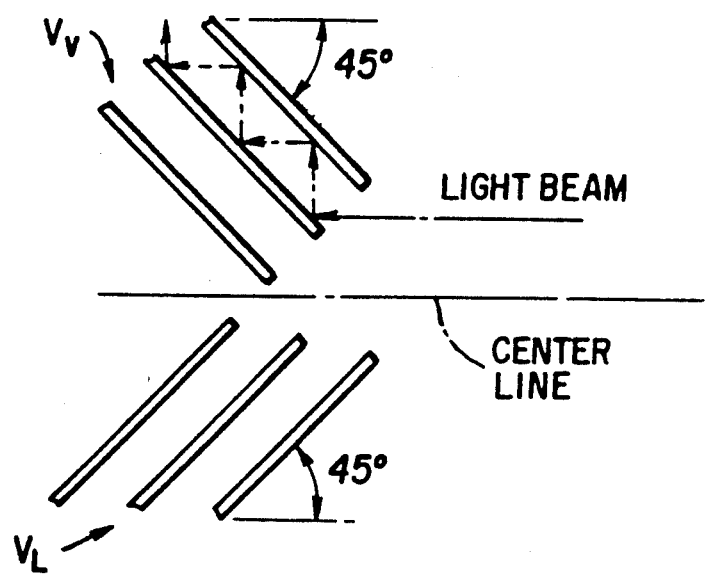

The infrared energy-dump E-D consists of an enclosure SP with upper and lower sets of blackened metal vanes ($v_u$, $v_L'$ FIG. 17) to absorb the IR. A fan FN is provided at one end of enclosure SP to draw cooling air over vanes v. FIG. 21 rather schematically illustrates this Energy-Dump E-D in side view (upper vanes in FIG. 22), showing fan FN at the rear of enclosure SP, with upper and lower sets vanes ($v_u$, $v_L$) indicated in phantom (see arrow denoting air-flow over vanes; assume IR beam from hot-mirror 2-1 enters to impact reflector SR at the front of SP —see schematic front view in FIG. 24). As indicated in FIG. 23 (a schematized, partial, side-view), upper and lower vanes $v_u$, $v_L$ face one another, leaving a "convergent-cone" space there-between for beam-entry. In each set, the vanes are aligned parallel and equi-spaced (e.g. ½" apart); they obliquely-face the opposite set, being disposed at 45° to the centerline of SP. Reflector S-R, provided at the front of SP, diverts the in-coming IR beam into the conical "mouth" between the two sets of vanes ($v_u$, $v_L$). With the IR component removed, the remaining beam spectrum will be "safer" (cooler) and more closely "matched" to the response of the CCPD.s (see below).

The resultant "cooled" light beam is passed from hot mirror 2-1 to a beam splitter 2-3 (FIG. 11); i.e. a partially-metallized mirror that reflects one-half the beam and passes the other half. Between beam splitter 2-3 and hot mirror 2-1, a safety shutter Sh is preferably provided for selective interception of the light beam, whereby to divert the entire beam to Energy-Dump E-D in the event of emergency shut-down or for maintenance purposes (the beam from lamp LS is powerful enough, when focused, to cause injury to the human eye; note: Xenon lamp LS is preferably kept lit at all times during system operation; lamp life degrades as a function of the number of ON/OFF cycles). Shutter sh is preferably mounted to be pivoted down (as shown), when activated, and is sufficiently reflecting to so direct the entire beam to E-D (to reflector S-R thereof—see FIG. 17).

Figure 13:
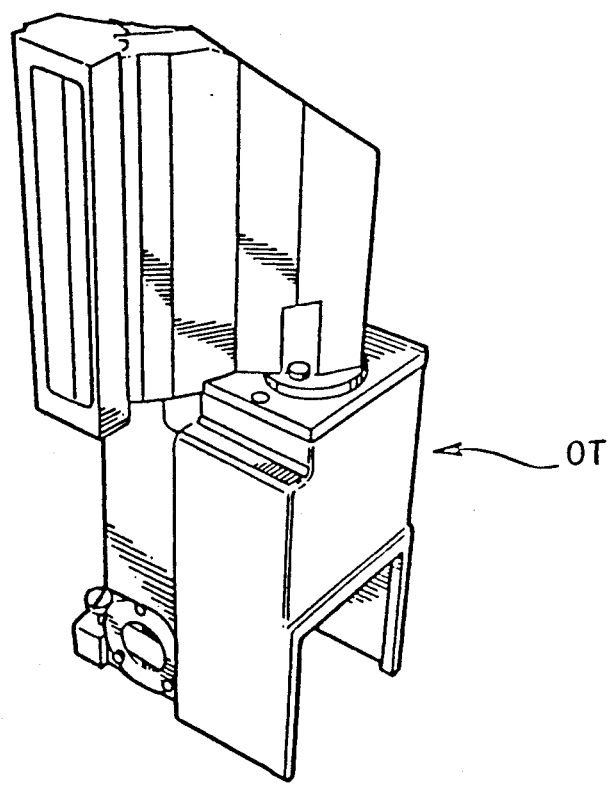
FIGS. 13, 13A are upper perspective views (front and back) of such a bundle.
Figure 13A:
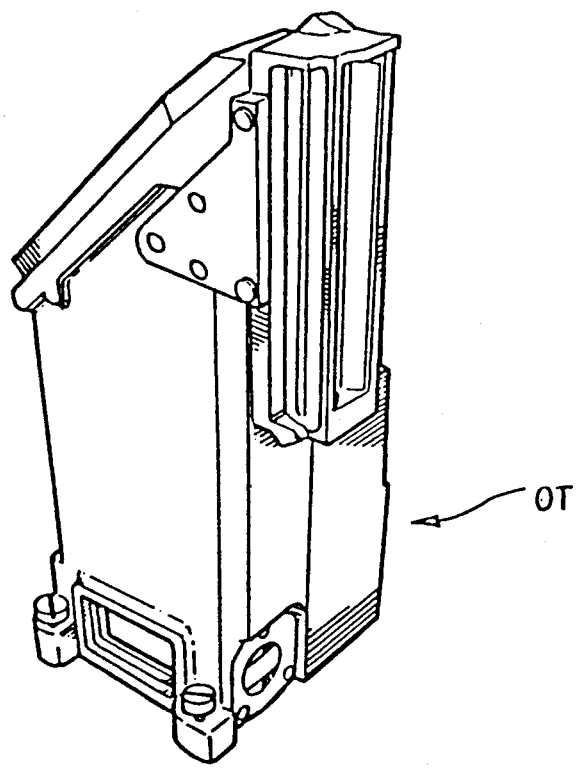
Figure 20:
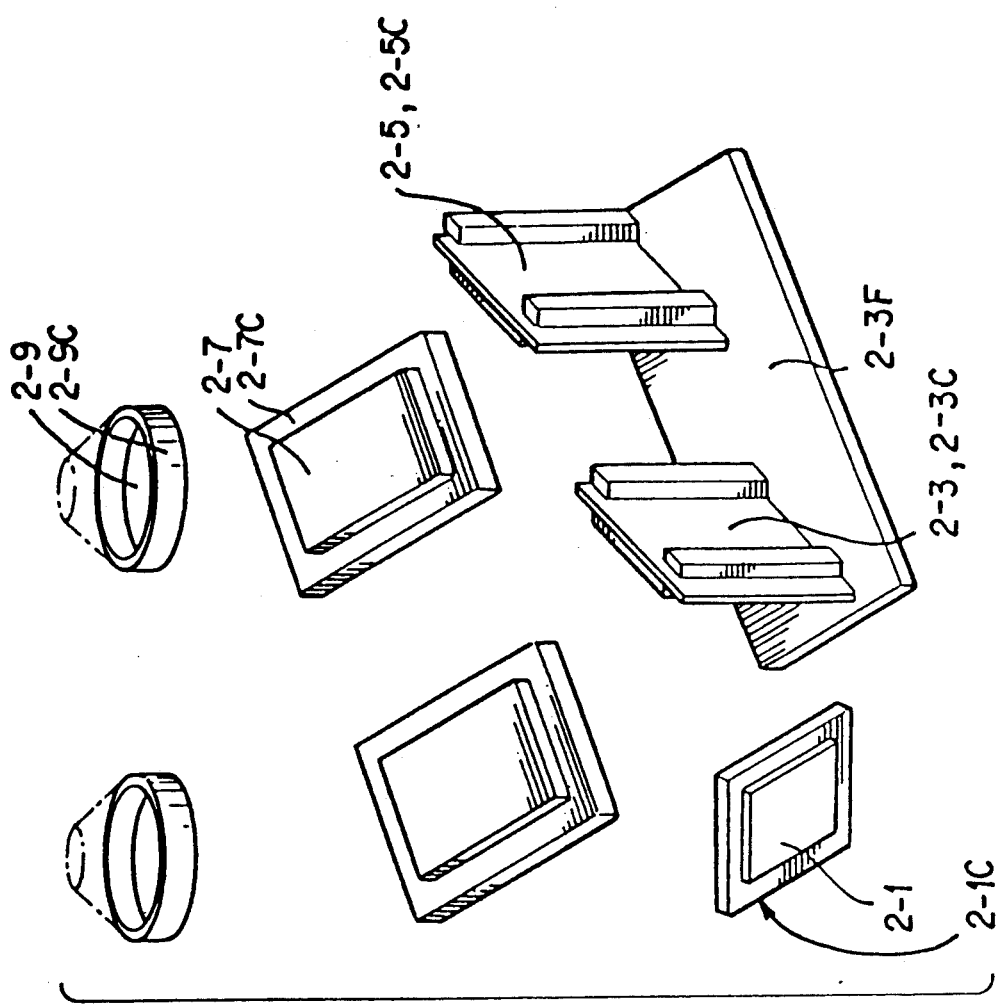
FIG. 20 is a similar functional diagram of some of this illumination-optics.

Beam splitter 2-3 thus develops a pair of like illumination beams, a "Front-beam" sent to the front side of the document, and a "Rear-beam" to the back side. Thus, from splitter 2-3, one beam is reflected to Front-illumination mirror 2-7', while the other (the thru-beam) goes to a Corner Mirror 2-5. (FIGS. 11, 17, 20). Mirror 2-5 diverts its beam to a second (Rear) illumination mirror 2-7. Illumination mirrors 2-7, 2-7' are essentially identical; each diverts its beam upward through a respective illumination lens 2-9, 2-9' (these are identical), and—according to a feature hereof—they can (adjustably) focus the appropriate beam-size (amount of light) on the entry-aperture of their respective fiber-optic bundle thereby regulating the amount of light emitted at bundle output (e.g. see FIGS. 13, 35 13A).

Figure 26:
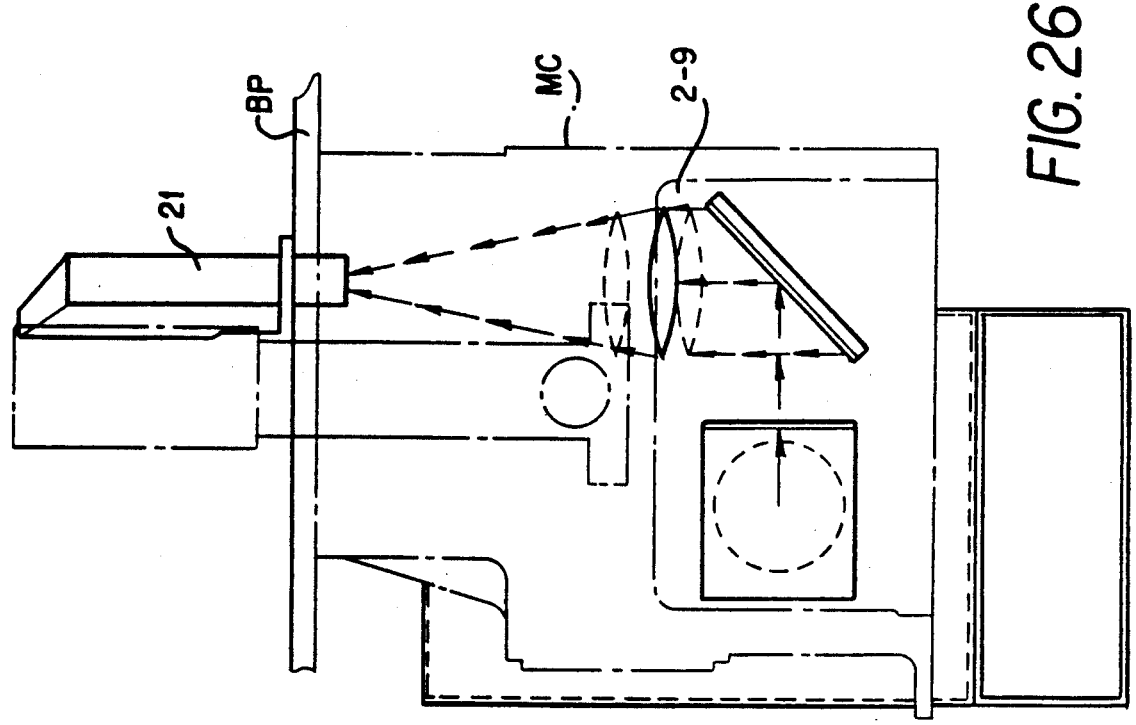

That is, rather than reducing lamp-power/intensity (e.g. via a potentiometer controlling lamp-current) as would be more conventional, we prefer to move these Leses 2-9, 2-9' toward or away from their respective fiber bundles 21, 21' and by so adjusting focus, adjust and "match" their beam intensities, quite easily and inexpensively (e.g. see 2-9 in FIG. 26, where such shifting is indicated in phantom). As discussed later, each fibre bundle 21, 21' is adapted to receive a relatively circular input light-beam and to output it, reshaped and with segments redistributed, as an elongate "bar" (rectangular beam) of light which is quite uniform along its length and (narrow) width.

Figure 14:
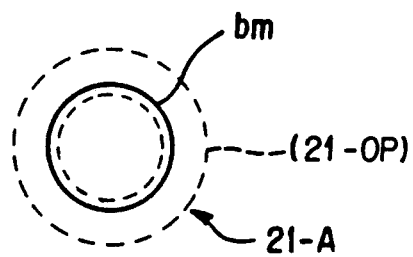
FIG. 14 is a schematized front view of an input face of such a bundle.

Thus, as illustrated very schematically in FIG. 14 (front view of a "circular" fibre-bundle input-face or entry-aperture 21-1F, with 21-OP representing the outer periphery of this input-face), workers will appreciate that simply shifting such a lens 2-9, 2-9' to change its focus, one can quite simple change the beam-diameter on an entry-aperture 21-F (changing intensity at output face 21-E; yet do so proportionately), —while still keeping the output "bar" quite uniform in intensity etc. (e.g. an input beam twice the size of maximum aperture OP would yield about ¼ the output intensity). Thus, for example "maximum" beam intensity can correspond to an input beam-diameter matching that of the full entry-apertures; then output intensity can be adjusted-down by simply changing lens focus to enlarge this beam's input-diameter and so reduce the amount of entry light. And the two (Front, Rear) output "bars" can be "matched" in intensity quite easily and inexpensively (e.g. a less-desirable alternative is the well-known, expensive, delicate "iris" structure used in consumer-type cameras). Thus, according to this feature, one can calibrate and match the two illumination intensities by simply adjusting each focus-lens onto its fibre bundle entry-aperture. And so, for calibration of illumination-intensity, each beam of light focused on its fiber bundle is regulated according to its lens-focus. As mentioned, each entry-aperture 21A (of a fiber-optic bundle) is relatively circular (e.g. diam. of .70"), while each output-aperture thereof is arranged to provide an elongate rectangular beam (bar of light), sufficiently high to span, and illuminate, the contemplated slit-height/document-height (e.g. 5.25" height "by 0.075"" width is found satisfactory). Each optic-fiber bundle is arranged to receive its respective input beam at its circular entry-aperture; and, the fibers are fanned-out, and "randomized", along their length—to be quite uniformly and randomly distributed along the rectangular output (exit-aperture). This converts the input circular beam to a rectangular output beam spanning its respective slot (vertically and horizontally). Interestingly, bar-size doesn't change as a lens is focused-defocused because of this "randomization".

Figure 12:
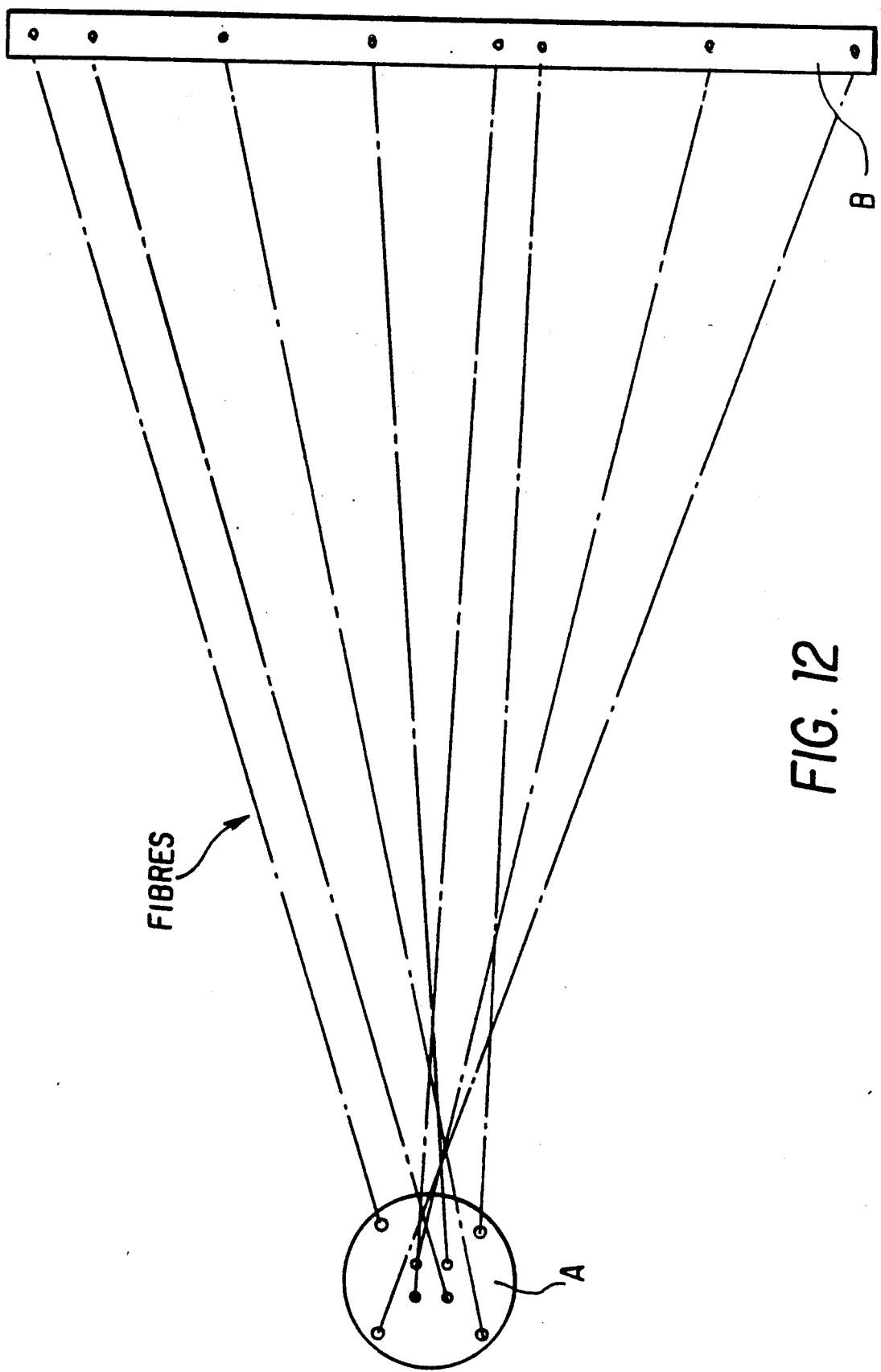

Thus, as a feature hereof, the optic fibers of each bundle are "inter-leaved" so that their output is "randomized", to yield light evenly distributed along across a respective slit. That is, as indicated fragmentarily, and very schematically in FIGS. 12, 15, fibers are arrayed from circular entry-aperture A to rectangular exit-aperture B so as to randomly and evenly distribute light along exit aperture B. For example the fibers at the center of entry-aperture A (where intensity may be maximal) might be distributed uniformly along exit aperture B. Similarly, fibers (any number) at the periphery of A (where intensity may be a minimum) will be distributed uniformly along B, yet in random fashion (e.g. see FIG. 14A giving illustrative specification for 21).

Such randomization can be achieved by arraying a first bunch of fibers in a layer along the length of aperture B, then gathering this "bunch" into a "first cluster" at aperture A —and then repeating this many times, with each successive cluster placed at a different spot in circular entry-aperture A, until the appropriate aperture-B-thickness (width) is built-up.

Figure 15:
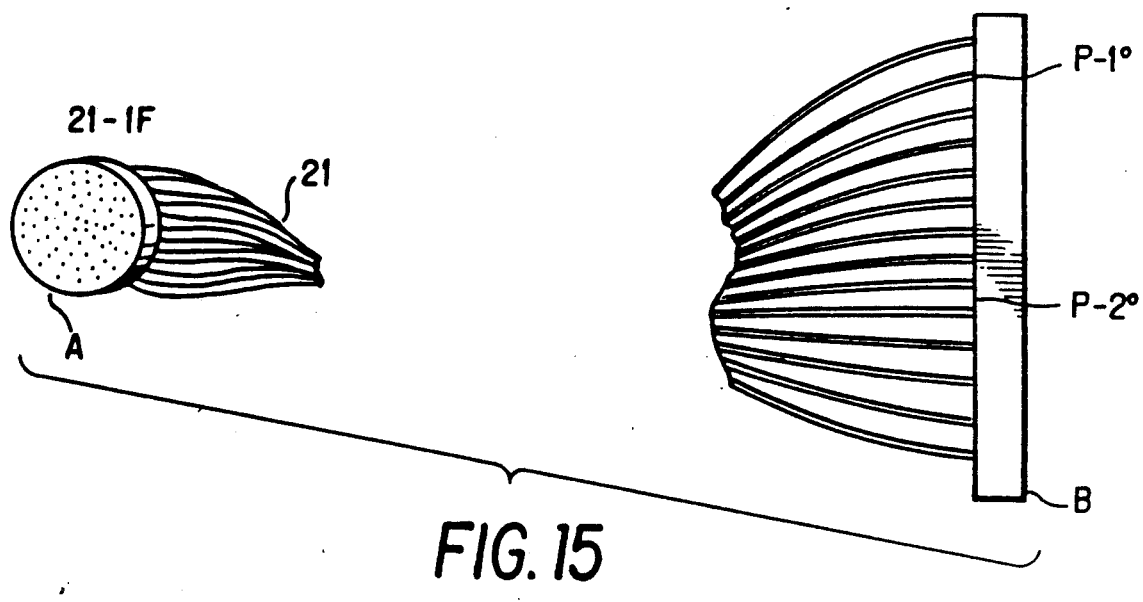
FIG. 15 is a diagram in the fashion of FIG. 12 indicating testing of such a bundle.

FIG. 15 very schematically illustrates the kind of results that such randomization should achieve. Here, a fibre bundle 21 will be understood as depicted with circular entry aperture A and rectangular exit-aperture B. Now, with ambient (or other reasonably good) illumination on B, one places a pencil P (or other narrow light-obstruction, as P-10) across any part of B, at random, and observes the effect at A. Where A will normally exhibit a dull white "glow", the obstruction should produce a "sprinkled-pepper" effect (as in FIG. 15), with a few tiny black "dots" (dark points) sprinkled relatively uniformly across A. Then, successive "blockings" at any other points along B should yield a similar effect. What should not appear at A are relatively large opacities, or a very non-uniform distribution of block dots.

Two dual, Anti-Shadow illumination-beams.

Each Symmetrical (Front, Rear), illumination assembly (e.g. FIG. 36 for Front-illumination) divides the light (again) into two equal portions; these portions to be focused onto (their side of) the document in tandem, from opposite 30 degree angles. This ensures that a document is evenly illuminated from two angles. For example, otherwise if the document has creases, those may cause a shadow which could compromise the output image. Illuminating each side of the document from two symmetric opposing 30-degree angles reduces the possiblity of such shadowing effects.

Each such Symmetrical illumination assembly thus shines its two light-bars onto the document through an "optical gate" (slit) at ±30 degree angles to compensate for document imperfections and provide more uniform document illumination. The embodiment that provides these two "dual-symmetric-oblique illumination beams on each side of a document will now be further detailed. Since Front-side illumination-optics are essentially identical to those for the Back-side, only the Front-side will be detailed (see FIGS. 35, 36).

Here, the "elongate rectangular beam" (light-bar) output from the Front fiber-optic bundle 21' goes to a respective beam splitter (14-1' in FIG. 36), where 50% of the light-bar is reflected and 50% is transmitted, so that two beams are presented on each side of the Front slit. One of these beams goes to a cylindrical plastic convex lens (e.g. 14-5') that focuses its beam through the slit and onto the "document image plane" I-P (i.e. the locus of document-passage). The companion beam goes thru a different cylindrical plastic convex lens 14-3' to a mirror 14-7' which directs it onto the same point of the "document image plane"—but does so from a symmetrically-opposite angle (so the beams converge at ±30° from the "normal" to plane I-P; see "normal" OCL). This is done via adjustable back-mirror 14-7' which can be set at the appropriate angle to so direct its beam onto "image plane", I-P at the same point [thru image-slit in guideway].

Each such Front/Back optics system is identical and "symmetric", so that, on the Front and Back side of the document, dual, converging beams impinge on their slit and on "image plane" IP—the Front slit being offset from the Rear. We have found that so projecting dual illumination beams at these ±30° angles provides optimal light intensity and image clarity. As workers know, maximum illumination intensity is typically along the "normal" to a document (i.e. the perpendicular to its plane) —but, unfortunately, this is also where glare is a maximum; also this is where it is most desirable to capture an image. We find that "anti-shadow" illumination is best directed at about 45° to the document—but this angle gives an intensity-level that is usually too low and inefficient (cf. reflected intensity falls-off sharply as one moves away from the "normal"); so we prefer to accept less thand optimal anti-shadowing as a trade-off to increase intensity to a more satisfactory level—and we have found that, for embodiments like this, opposing angles of ±30°(±5°) are surprisingly good.

"Image plane" I-P will be understood as (e.g. FIG. 35) defining the locus of both the front and rear sides (close enough) of a document as it is being read at the two offset "imaging sites" along the document transport track. Each such "site" is defined by a respective slit-opening SL in the guides, covered by glare-resistant glass and offset from the other slit by about 0.445 inches. It is important that document location be closely controlled; i.e. for optimum focus and minimal image-distortion (due to Front-to-Rear movement of a document in the track), the document should be restrained within ±0.045" of nominal track-centerline (i.e. intersection of dual, converging beams). Given this, the images produced by the two Front/Rear illumination beams can be captured with uniform balanced illumination. Light intensity is optimum where each (FR, R) set of dual converging beams intersect, and falls-off sharply as one moves away from this intersection.

The Front "image point" (slit) is offset from that in the Rear by a spacing (e.g. 0.445 inches in the preferred embodiment) sufficient to avoid interference between beams (e.g. "back-light" from one illumination-beam could pass thru the thin paper document and interfere with illumination-imaging on the opposite side.) System electronics processes the analog signal from the CCPD detector. A Front CCPD captures the image on the front and a Rear CCPD captures that on the back side of the document; and appropriately times and records the signals received so that the images recorded for the front and rear sides are properly coordinated and are identifiable (as a pair) for processing and storage.

System calibration and "illumination-set-up" consist in adjusting the illumination lenses 2-9, 2-9' and mirrors 2-7, 2-7' (FIG. 11) to direct and focus the desired (circular) beam-size onto the circular input-aperture of each fiber-optic bundle 21, 21'; then adjusting the Front and Rear mirrors 14-7, 14-7' (FIG. 36) to focus the two respective pairs of oblong illumination beams (thru a resp. slit) so that each pair meets at a common point along the "document image plane" I-P.

Having described the "path of illumination", we now turn to the "image-lift" paths; i.e. the optical paths of images from the front and the rear sides of the document (these are symmetric, and essentially identical). One side will be described in detail, with the understanding that the essential elements and description are the same for the opposite side.

Image-path (FIGS. 16, 30, 31, 32, 33)

Figure 16:
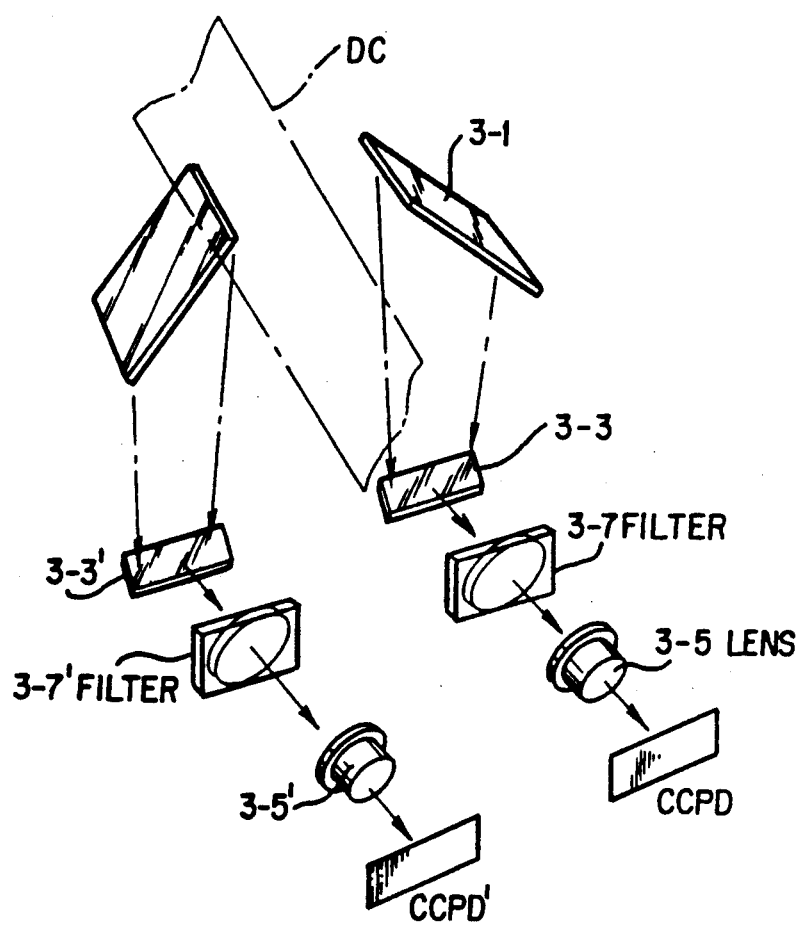
FIG. 16 is a schematic functional diagram of the imaging-optics portion of this embodiment; related imaging optics.

FIGS. 31, 16 very schematically and simply summarize the image-path (both Front and Rear use essentially the same elements). Thus, when a document portion (passing a respective slit) reflects the illumination to an image-mirror 3-1, it reflects it (down) to a rotatable Trunnion mirror 3-3. Mirror 3-3, in turn, reflects it to a respective CCPD, via a photopic filter 3-7 and image-lens 3-5. Mirror 3-3 can be rotated to center its beam on its CCPD.

Figure 19:
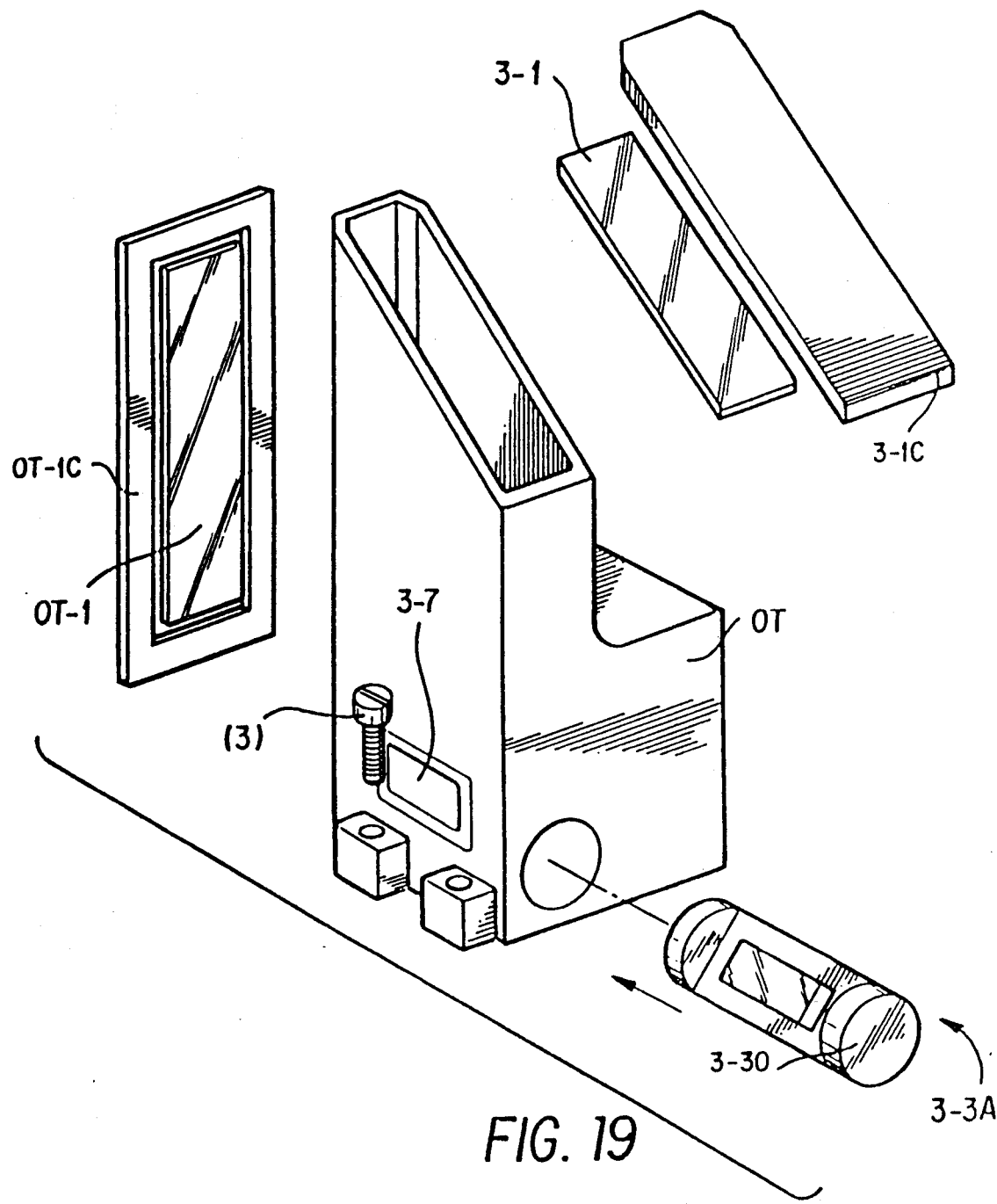
FIG. 19 is a similar functional diagram of how some the imaging-mirrors of the embodiment are packaged.

Thus, the Front/Rear dual illumination beams (from a respective fiber-optic bundle, after splitting) will be understood as impacting the passing document at offset points, each illumination beam being understood as reflected directly-back (i.e. normal to plane I-P) to a respective image mirror 3-1, 3-1', tilted at 45 degrees from plane I-P (FIGS. 16, 31, 32). Each image mirror 3-1, 3-1' (Front, Rear) re-directs its reflected beam vertically down to a rotatable "plane trunnion" mirror 3-3, 3-3', which diverts its beam, aiming it to be centered on the associated CCPD via a filter 3-7, 3-7' and a focusing lens 3-5, (3-5'). Each trunnion mirror 3-3, 3-3' is mounted in a housing 3-30 (see FIGS. 19, 19A, 31) which allows it rotational adjustment, without disassembly, to adjust image position (center it) on its CCPD.

Figure 19A:
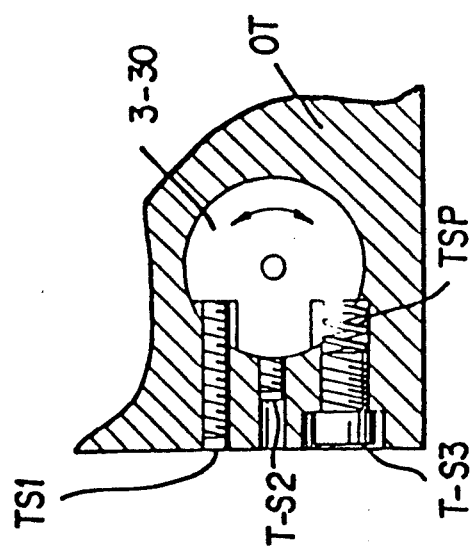
FIG. 19A is a section of a portion of the Trunnion mirror assembly thereof.

As shown in FIG. 19A, the adjustment mechanism consists of two set-screws TS-1, TS-2 which contact seats cut-out in the ends of the semi-cylindrical mirror-casing 3-30, each being threadably seated in the housing. More particularly, the trunnion cylinder 3-30 (FIGS. 19, 19A) is rotationally restrained between the tip of an adjusting set screw TS-1 and a coil spring T-SP (a music-wire coil compression spring lodged in housing OT to contact 3-30 restrainingly, being held in place by a machine screw TS-3). Rotation of set screw TS-1 will cause trunnion cylinder 3-30 to rotate about its axis against the force of spring T-SP. Once the trunnion mirror 3-3 is correctly located, a locking set screw TS-2 is tightened to lock the adjustment.

Each trunnion mirror 3-3, 3-3' thus diverts its image-beam horizontally, along a path essentially parallel to the document-path, through a "photopic" filter 3-7, 3-7" (See FIG. 31) and then through image lens 3-5, 3-5' which focuses the beam onto the associated CCPD (CCPD'). The photopic filters 3-7, 3-7' are described later; each comprises a plane glass plate with, multi-layers of thin dielectric film, superposed thereon. This series of optical coatings is especially formulated to shape the spectral response of the system as desired. the output from each filter thus tailors the image spectrum and conditions it (approximately as shown in FIG. 34-A, to approximate the response of the human eye; here, the light from a Xenon light source LS is "shifted-red" by approximately 25 nm to give this result.

Each image lens 3-5 (3-5'), following its filter, is made adjustable so as to focus its beam onto the surface of its CCPD; and, each can be adjusted for "Coarse" and "Fine" focus by means of a rotating-cam, driving in a slot of the Tower housing OT (see FIG. 26-A).

Figure 26A:
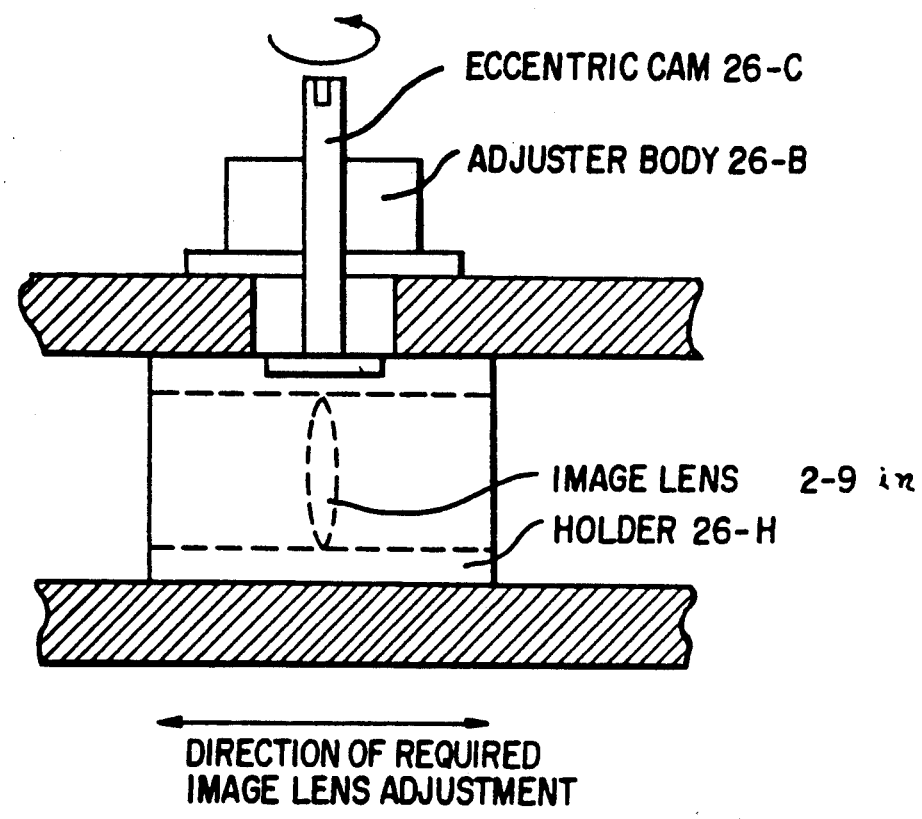
FIG. 26A is an enlarged detail thereof.

Lens 2-9 in FIG. 26 is illustrated in detail in FIG. 26A. An eccentric cam 26-C engages in a slot on top of the image lens holder 26-H. Rotation of cam 26-C will cause the image lens holder 26-H to move left/right by ±0.025" (the "throw" of the eccentric section of the cam). If more adjustment is required (±0.125"), the screws (not shown) securing the adjuster body 26-B may be loosened and the entire adjuster body, eccentric cam and lens holder moved back and forth.

For the "image-lift-path", "set-up" procedure consists in rotating each trunnion mirror 3-7, 3-7' to center its beam on its CCPD; then adjusting each associated image lens to focus its beam onto its respective CCPD.

The (two) Electronic Camera PWBAs each include a linear CCPD sensing array, with video signal amplification, clock generation, clock buffering, and power distribution circuits. The selected CCPD ("charge-coupled photo-diode") device will have a response analogous to the retina of the human eye when combined with the response of the photopic filter; this is a critical component of the system. In this preferred embodiment, a pair of like "Reticon RL-1288" Linear-array, silicon chips (with 1024 photodiodes) are used. The photodiodes are arranged and positioned to image the "vertical line" reflected image-beam from a document. Each like associated image lens 3-5, 3-5' gives magnification, as adjusted, to produce 0.005 inch-high pixels on the surface of their associated respective document planes I-P. Each CCPD diode array is subdivided into eight segments; each photodiode element of the array converts light reflected from the document into analog voltage values. The converted electron-charge on the photodiodes is transferred to an analog shift register within the chip when a transfer pulse is applied (not shown, but well known in the art). The odd and even numbered pixels of each segment are output separately. The sensing array outputs a representation of the scanned document as sixteen analog signals; each signal amplitude corresponds to a pixel's gray level. The Electronic Camera PWBA also outputs synchronization (clock) signals and identification signals (front, rear sensing arrays).

We have determined that an optimal system response for the light impinging on such CCPD.s (for our image-capture purposes—factoring-in the lamp, filter and CCPD used) should approximate the sensitivity range of the human eye. This is indicated in the spectrum of FIG. 34-A. The spectral output of our selected Xenon lamp LS is fairly flat over the range 450-750 nm.; while peak human-eye spectral response is about 550 nm.

We find—somewhat surprisingly—that introducing "photopic" filters, as described, helps greatly to improve Blue-on-Blue contrast (i.e. contrast of blue-ink etc. on a blue background, as many checks etc. will exhibit).

Thus, we introduce filters 3-7, 3-7', which, when combined with the spectral sensitivity of the CCPD detectors, yield an overall system response closely matching that of the human eye, with actual system response shifted 25 nm toward the red end of the spectrum. We have found that such a shift improves the response of blue inks on blue backgrounds, and, to a lesser extent, blue/green and green inks on similarly colored backgrounds. Experience has shown that this wavelength shift is very effective for purposes of our instant document processing.

Our "system Response" should therefore be "photopic" and should approximate the response of the human eye [we are imaging documents which are to be "read" by the human eye and are made up of inks and materials visible to the human eye]. Without this "spectral shaping"—by the filter—of the light incident on our CCPD detectors, our system would "read" documents rather differently than the eye does. [e.g. it would "see" in the infrared and would interpret color contrast rather differently; but it is imperative to maintain proper, "human" color contrast when it comes time to reproduce the images for human use.]

FIG. 31 (see also FIG. 33) very schematically and functionally, illustrates the "imaging-path"; i.e. the path of the image reflected from (a slice of) the passing document to a respective (Front or Rear) CCPD. Thus, the image will be understood as reflected from the slit-illuminated part of document doc moving along image-plane I-P, to a respective image mirror 3-1 (3-1' on other side); thence to a respective turnnion mirror 3-3 (3-3'); thence to its CCPD via respective "photopic" filter 3-7, 3-7' and focusing lens 3-5, 3-5'.

Imaging Process Recapitulated (FIGS. 31, 33 described for Front side; Rear side the same)

Light reflected from the front "slice" of the passing document is directed to an "optical tower" (Front tower, OT, Rear Tower OT', see FIGS. 32, 33 19) housing an assembly of mirrors. The light entering each optical tower is reflected down by an Imaging mirror 3-1, to a Trunnion mirror 3-3 below the transport level. Each Trunnion mirror swivels on a dowel or pin (see 3-30) and can be set (rotated) to center its beam on its CCPD (see FIG. 19A also). Thus, Trunnion mirror 3-3 diverts its light 90° to related "photopic" filter 3-5, which ensures that the optical system's spectral response is optimized for the CCPD, and better approximates human-eye response [each photopic filter is located at the base of its optical tower.]

Each image reflected by the trunnion mirrors passes through these filters on its way to the CCPD sensing array. After passing through the photopic filter, the image is focused onto a respective charge-coupled photo-diode (CCPD) sensing array (see "Electronic Camera PWBA" or printed circuit board assembly) by an associated Imaging lens 3-5.

Thus, as a document passes through the Camera Submodule, an intense vertical stripe of filtered light is focused on each side, to be reflected from the document to a respective CCPD sensor mounted on an Electronic Camera PWBA.

The Electronic Camera PWBAs convert the light so reflected from the document into analog voltages, amplify these and send them to an Electronics Gate Submodule for Analog/Digital conversion, processing, compression, and eventual transmission to temporary storage [cf. the images are sent to a Storage and Retrieval Module SRM for subsequent retrieval by an application program —see 1-13, FIG. 1]. FIG. 34A gives the spectrum of total system spectral response (i.e. output from CCPD, factoring-in effect of lamp, optics and filter, etc.).

Optic elements, recapitulation

Preferred specifications for some optical elements described above will now be given. The CCPD sensing arrays preferably consist of 1024 photodiodes aligned, in one dimension, to image a vertical line of the document. The array is subdivided into eight segments, with each photodiode converting its portion of the image to an analog voltage (cf. light-induced charge accumulated on the photodiode). This is transferred to an analog shift register within the chip when a transfer pulse is applied (not shown, but well known in the art). The odd- and even-numbered pixels of each image (diode) segment are output separately, thus, each CCPD sensing array outputs a representation of each scanned document "slice" as sixteen analog signals, with the amplitude of each signal corresponding to its pixel's "gray level". The Electronic Camera PWBA also outputs synchronization (clock) signals and identification signals (front or rear sensing arrays).

The imaging module 1-110 incorporates several different types of lenses and mirrors. Thus, illumination lenses (2-9', 2-9 FIG. 11, which focus light onto a respective fiber-optic bundle 21, 21'), are preferably 75 millimeter (diameter), plano-convex lenses with a focal length of 150 millimeters. Imaging lenses 3-5, 3-5'

(FIGS. 16, 13, which accept light reflected by the document and focus it onto a CCPD sensing array) are f2.8, high-resolution lenses with a focal length of 50 millimeters.

"Maximum reflectance" mirrors (front-surface mirrors with 99 percent reflectivity) are preferably used as: corner mirror, 2-5 (FIG. 17), Front and Rear illumination mirrors, 2-7, 2-7', (FIG. 11) imaging mirrors 3-1, 3-1' (FIG. 32) and trunnion mirrors 3-3, 3-3'.

Workers will recognize that, instead of the preferred "linear" silicon CCPD.s; in some cases Gallium CCPD.s may be used, and/or two-dimension arrays—or even "Camera tubes". Workers will also recognize that there are special advantages to using focus-adjustment to vary beam intensity (cf. adjust lens, vary beam-size on fibre-optic input-face)—notably, that this involves no wavelength-shift, as with more conventional methods. For example, it is common, with an incandescent lamp, to change the filament-heating input-current to vary light intensity—unfortunately this also shifts the wavelength spectrum of the light, giving obvious problems to a CCPD or other "camera" means (similar problem with halogen lamps). So, workers may prefer our focus-adjustment of intensity as being unusually "wavelength-stable".

Xenon lamps (gas-discharge) are similarly "wavelength-stable" when their intensity is varied; fluorescent lighting is almost as "wave-length stable", but yields somewhat less-intense light, and this would be a less-preferred alternative.

Single-casting mount

Figure 27:
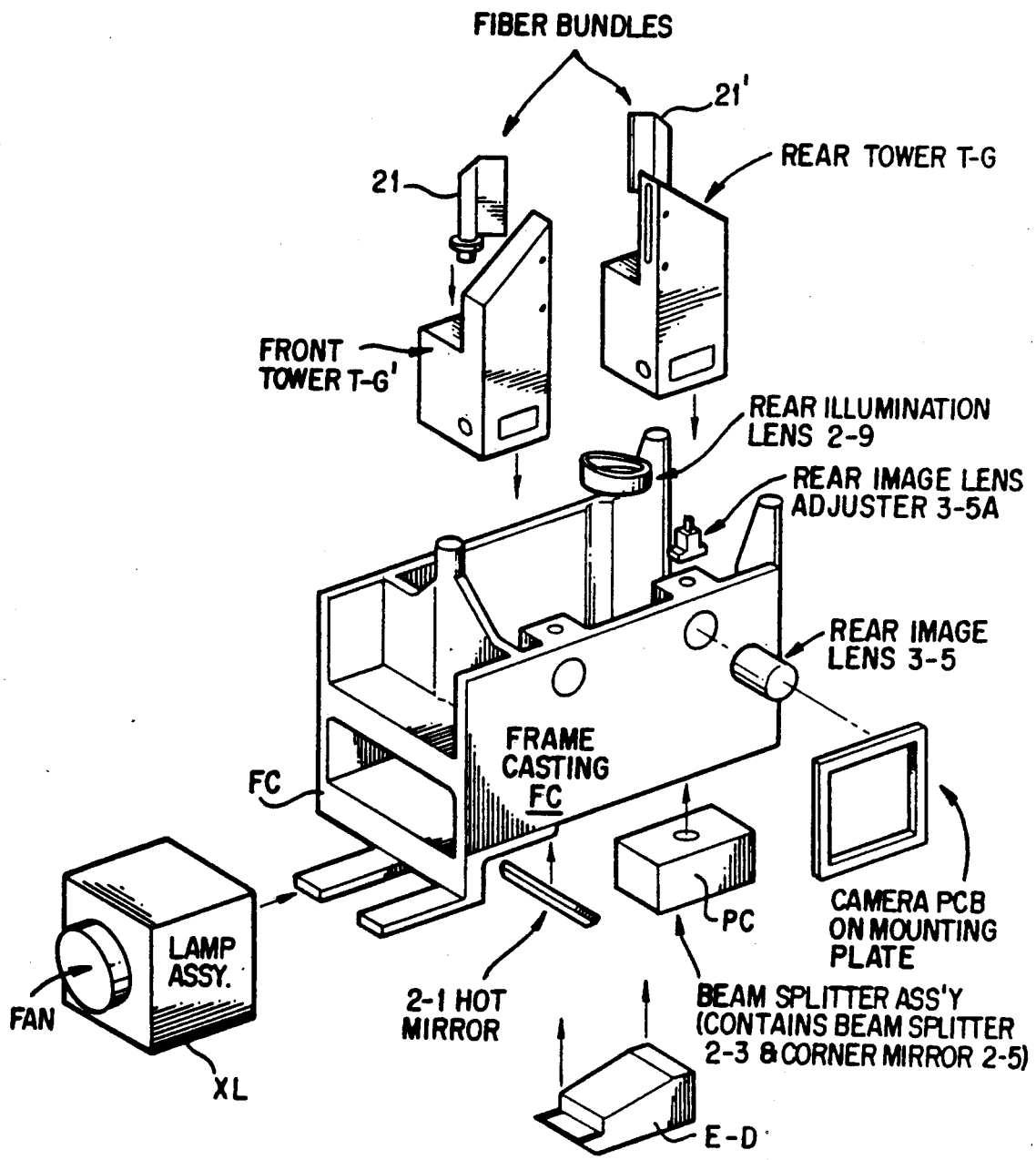
Figure 28:
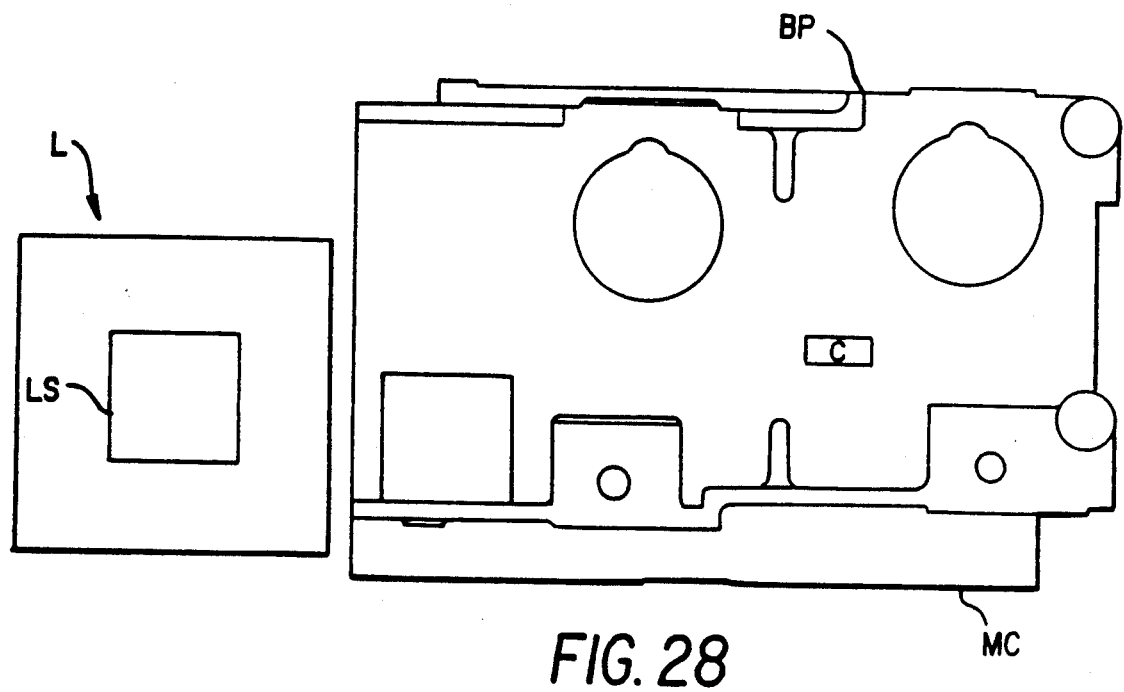
FIGS. 28, 29 are side sections of this casting.
Figure 29:
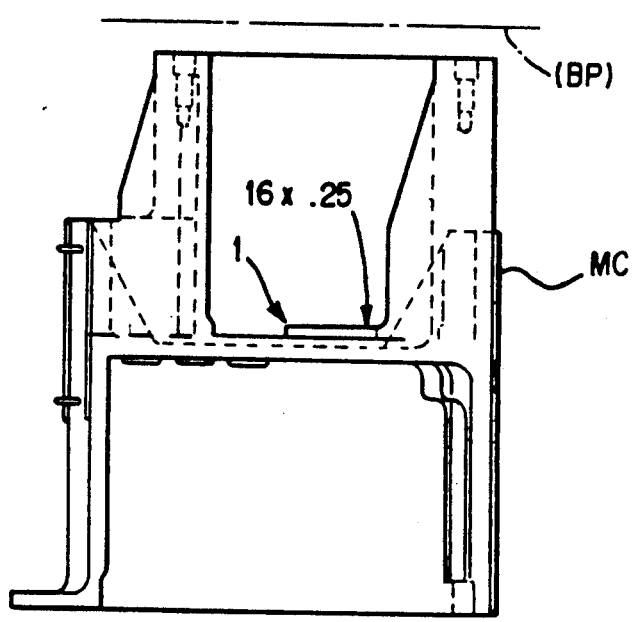

We prefer to mount illumination-optics, and the heat-producing lamp and its energy-dump, well below the transport array (platform, guides, belts, etc.) to enhance safety, ease of heat rejection, ease of assembly and ease of efficient servicing. By contrast, it would be more conventional to mount these items on the transport platform. Thus, as seen in FIGS. 27, 28, 29, the entire image-lift arrangement is modular, and is mounted on a single main casting M-C which is affixed (bolted) to a base plate BP (FIGS. 28, 29, 9) which carries the document-transport array. The lamp (housing HG) and energy-dump unit E-D are mounted on a related bifurcated casting FC which is affixed (bolted) to the main casting M-C but under BP. On (or in) main casting M-C are mounted the components making-up both (Front, Rear) "illumination paths" and both "image-lift paths" as described above. A parallelogram-shaped casting P-C, open at both ends, contains the illumination-beam splitter 2-3 associated corner mirror 2-5 (FIG. 27) as an integral modular unit, and is attached to MC. Tower-castings T-C, T-C' (e.g. see FIG. 9A, note machine cover ccv. raised) for each side of the document, each incorporate a 45° image mirror 3-1, 3-1' (FIGS. 16, 32, 27), an associated rotatable trunnion mirror 3-7, 3-7' and a photopic filter 3-7, 3-7'. The image lenses 3-5, 3-5' and respective two CCPDs (each on a circuit board) are attached on a wall of main casting M-C.

Figure 27A:
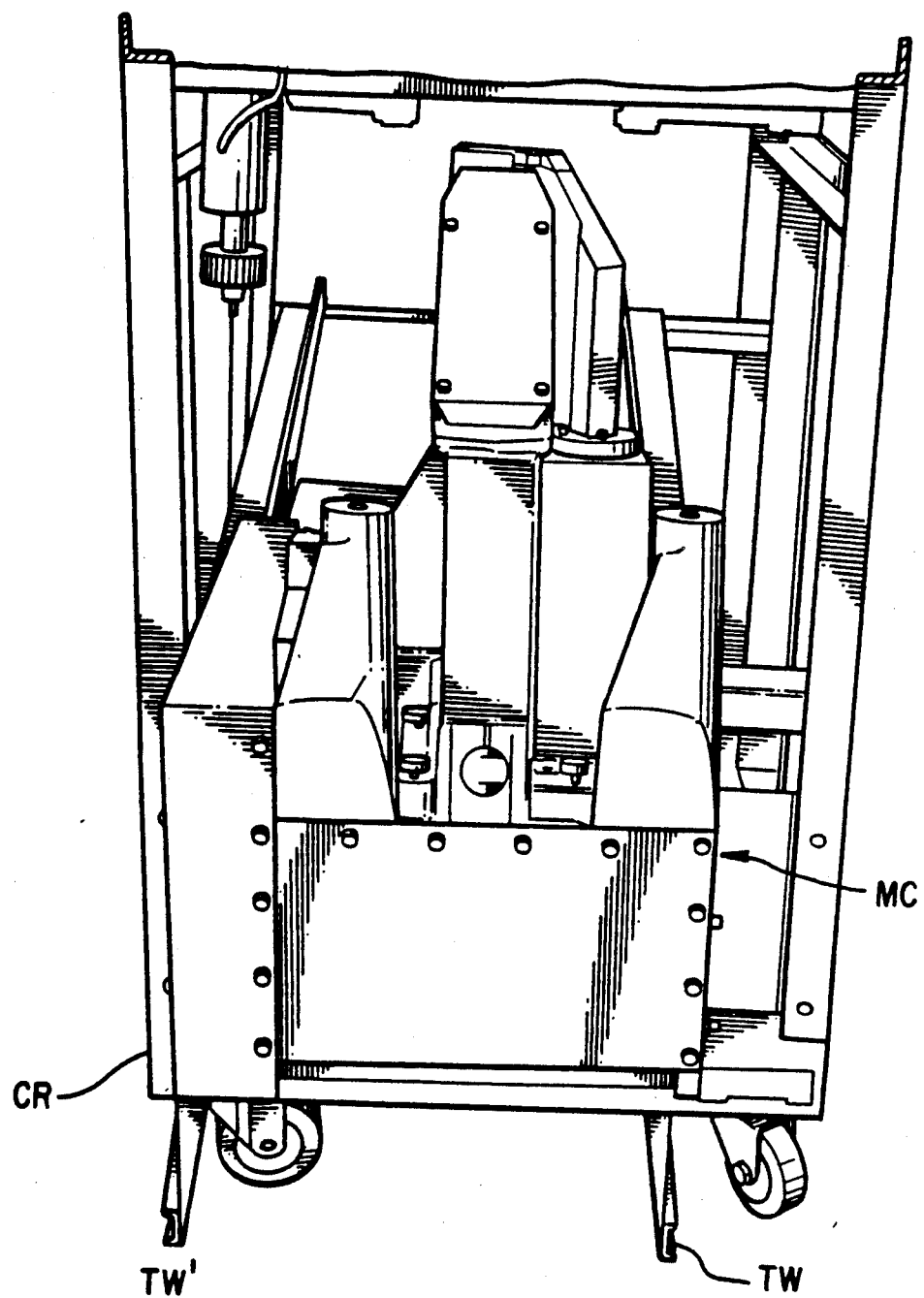
FIGS. 27A, 27B, 27C show the casting installed in a Processor.
Figure 27B:
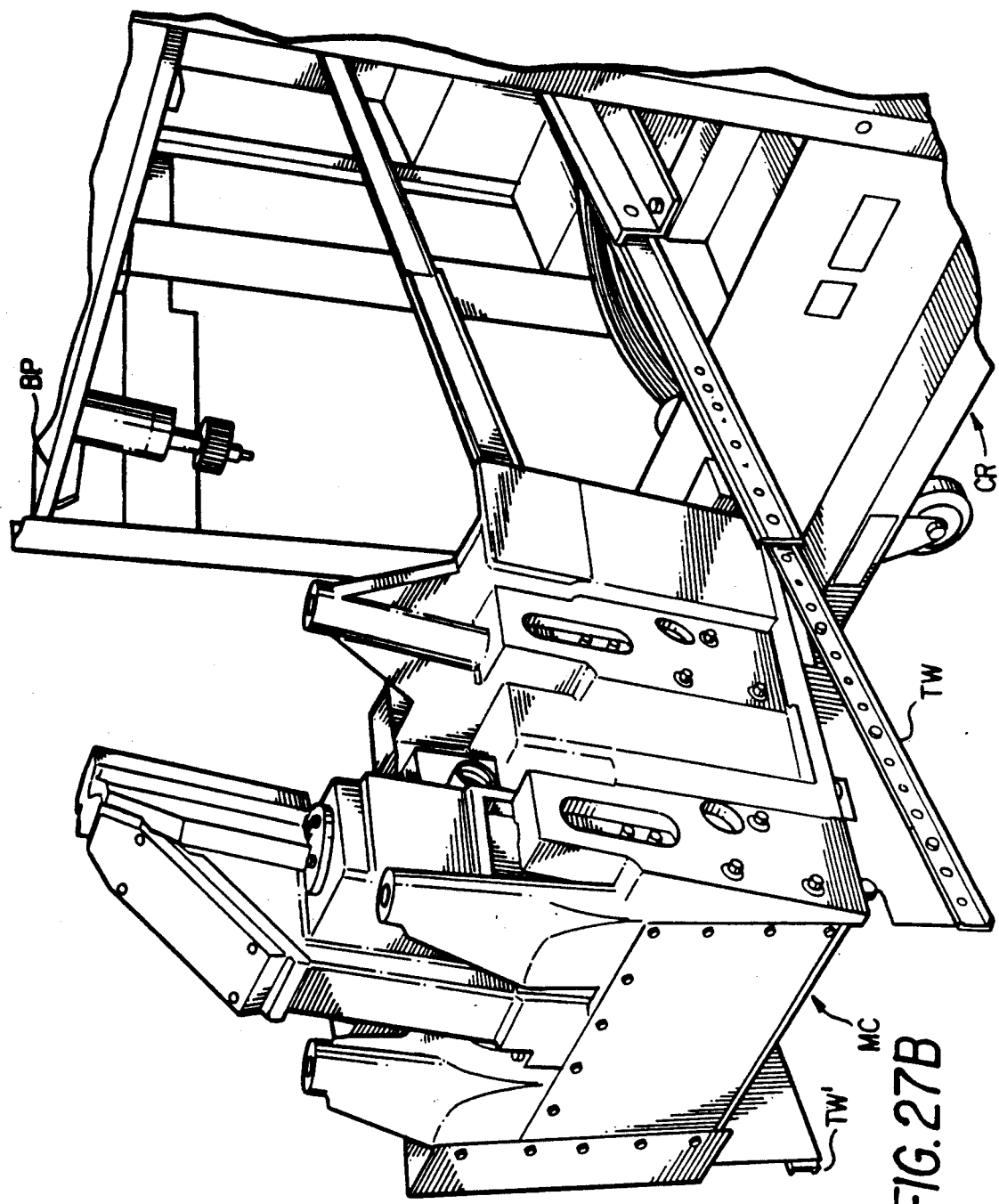
Figure 27C:
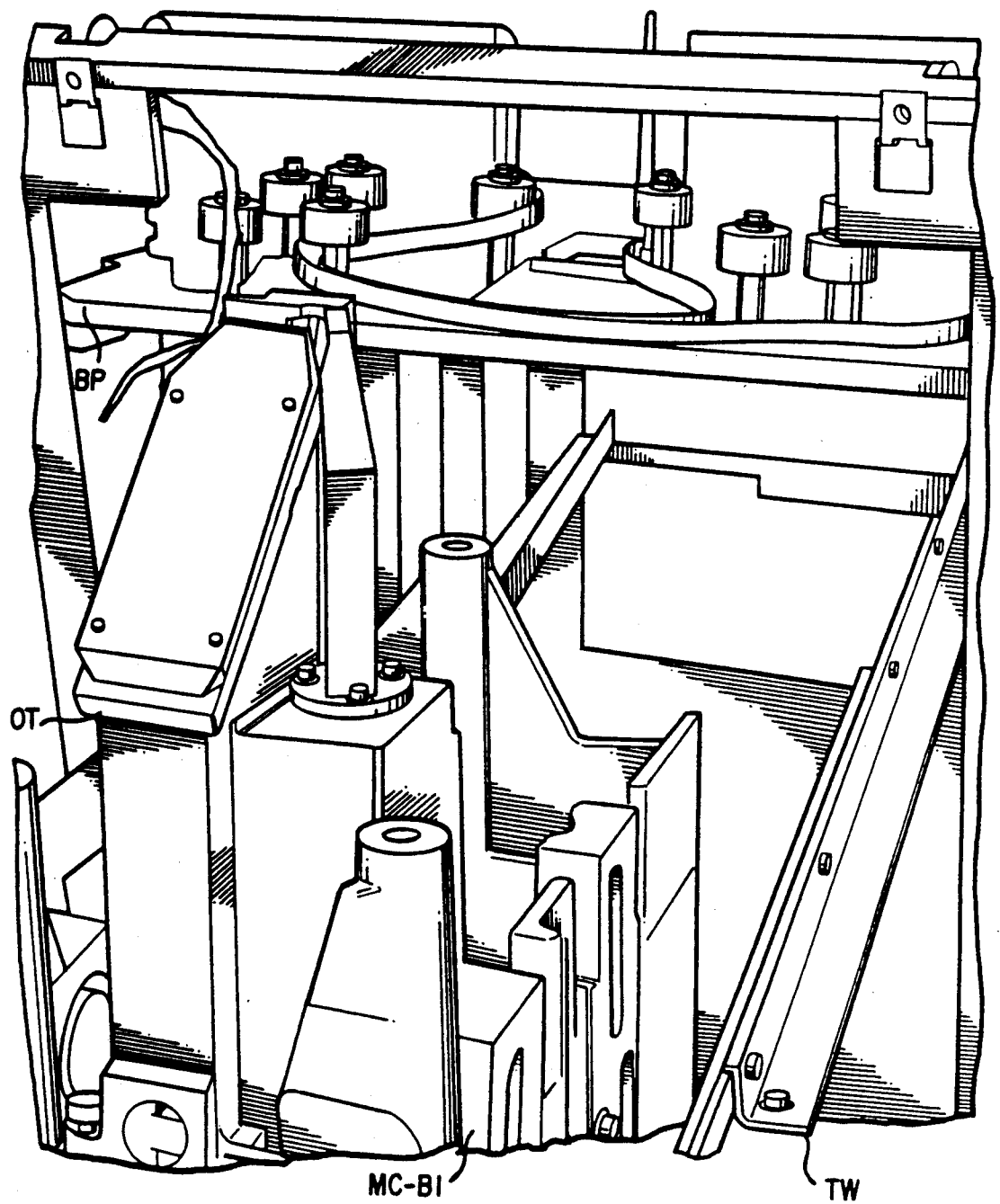

FIG. 27A shows casting MC, with one optical Tower casting mounted thereon, placed within frame CR of the document processor 1-11, on a pair of extensible rails Tw, Tw' (partly extended). FIG. 27B is a side view, showing the rails Tw, Tw' almost-fully extended, with transport base-plate BP pivoted up. FIG. 27C is an enlarged view of FIG. 27B, with up-tilted base-plate BP and part of casting MC shown in more detail (e.g. note the two casting "coupling-turrets" MC-B1, MC-B2; these, plus a third, MC-B3, will be understood as fitting just under base-plate BP when the casting MC is rolled-into Processor 1-11 on its rails Tw, Tw', and the base-plate is dropped into working position—so that three (3) bolts into MC-B-1, -2, -3 can detachably connect MC firmly to BP.)

In conclusion, it will be understood that the preferred embodiments described herein are only exemplary, and that the invention is capable of many modifications and variations in construction, arrangement and use without departing from the spirit of the claims.

For example, the means and methods disclosed herein are also applicable to other related document imaging systems. Also, the present invention is applicable for enhancing other forms of imaging and related optical arrangements.

The above examples of possible variations of the present invention are merely illustrative. Accordingly, the present invention is to be considered as including all possible modifications and variations coming within the scope of the invention as defined by the appended claims.

What is claimed is:

1. A method of illuminating checks in a check-processing system wherein a large number of checks are rapidly, continuously transported past two or more imaging stations, each station having a prescribed image-site, and being illuminated by prescribed source means which projects two or more illumination-beams, one to each said station; said method for each said beam, comprising:

providing beam-adjust means comprising focus/-defocus intercepting said beam and adapted to change its focal point; providing a fibre-optic array in the beam path to thereby define and input beam therefrom, at or near the approximate focal point of said focus means and, said array being arranged to exhibit an entry-face of prescribed diameter $D_c$ and an exit-face configured to illuminate the respective site relatively uniformly thus defining an exit-beam therefrom, the fibres of the array being arranged and distributed, in uniform, random fashion completely across this exit-face; and, arranging and adapting said focus means to variably de-focus said input-beam and change beam-diameter, at said entry-face, sufficient to spread the beam sufficiently beyond the entry-face to thus controllably reduce the amount of the beam entering said entry-face.

2. The method of claim 1 wherein each said focus means comprises adjustable-focus lens means.

3. The method of claim 2 wherein each said lens means is arranged and adapted to normally project a maximum-diameter input-beam onto said associated entry-aperture, while also being adapted to shift its focus and gradually enlarge the input-beam it projects onto said entry-face, and thereby decrease exit-beam-intensity at the respective exit-face.

4. The method of claim 3 wherein the fibres of each array are so randomized, yet uniformly distributed across its said exit-face, that anomalies across said input-beam to said entry-aperture are uniformly distributed along the said exit-face thereof.

5. The method of claim 4 wherein there are two exit-beams and wherein these two exit-beams are to be balanced and matched in intensity by said varying of said focus and beam-diameter.

6. The method of claim 5 wherein each beam is relatively circular in crossection and wherein each said entry face is likewise relatively circular in cross-section; and wherein the beam is converted to be relatively-rectangular at the said exit-face of said array; and wherein control means is also provided for adjusting said focus/-defocus means sufficient to so reduce beam size at said entry-face as to reduce beam intensity at said exit-face a prescribed amount.

7. A method of illuminating checks in a check-processing system wherein a large number of checks is rapidly transported past one or more imaging stations, each station having a prescribed image-site and being illuminated by prescribed source means which projects one or more illumination-beams to each said station; said method for each said beam comprising:

providing beam-adjust means intercepting said beam and adapted to change its focal point;

providing a fibre-optic array in the beam path at or near the approximate focal point of said beam-adjust means, said array being arranged to exhibit an entry-face of prescribed configuration and diameter $D_c$ and an exit-face configured to illuminate the respective site relatively uniformly with an exit-beam therefrom, the fibres of the array being arranged and distributed, in uniform, random fashion completely across this exit-face; and, arranging and adapting said beam-adjust means to defocus the beam and so change beam-diameter at said entry-face sufficient to spread the beam sufficiently beyond said entry-face as of said fiber-optic array to so controllably reduce the amount of the beam entering the array.

8. The method of claim 7 wherein each said beam-adjust means is arranged to comprise adjustable-focus lens means.

9. The method of claim 8 wherein each said lens means is arranged and adapted to normally project a maximum-diameter beam onto said associated entry-face, while also being adapted to shift its focus and gradually enlarge the beam it projects onto said entry-face sufficient to thereby decrease beam-intensity to a prescribed intensity at the respective exit-face of the array.

10. The method of claim 9 wherein the fibres of each array are so randomized, yet uniformly distributed across its said exit-face, that anomalies across the beam as presented to said entry-face are uniformly distributed along the said exit-face of the array.

11. The method of claim 10 wherein there are two illumination beams to each said station and wherein the two exit-beams for each said stations are to be "balanced" and "matched" in intensity by said varying beam focus and beam-diameter.

12. The method of claim 11 wherein each beam is relatively circular in cross-section; wherein each said entry-face is likewise relatively circular in cross-section; and wherein each said beam is converted to a relatively-rectangular beam at the exit-face of its fibre-optic array.

* * * * *